(12) United States Patent
Katz

(10) Patent No.: US 9,709,656 B2
(45) Date of Patent: Jul. 18, 2017

(54) TRACKING A RADIO BEACON FROM A MOVING DEVICE

(71) Applicant: Daniel A. Katz, Kiryat Ono (IL)

(72) Inventor: Daniel A. Katz, Kiryat Ono (IL)

(73) Assignee: Daniel A. Katz, Kiryat Ono (IL)

( * ) Notice: Subject to any disclaimer, the term of this patent is extended or adjusted under 35 U.S.C. 154(b) by 330 days.

(21) Appl. No.: 14/465,872

(22) Filed: Aug. 22, 2014

(65) Prior Publication Data

US 2016/0054425 A1 Feb. 25, 2016

(51) Int. Cl.
| | | |
|---|---|---|
| *G01S 3/14* | (2006.01) | |
| *G01S 3/46* | (2006.01) | |
| *G01S 3/00* | (2006.01) | |

(52) U.S. Cl.
CPC .. *G01S 3/14* (2013.01); *G01S 3/46* (2013.01)

(58) Field of Classification Search
CPC ..... G01S 3/02; G01S 3/14; G01S 3/46; G01S 1/02; G01S 1/022; G01S 1/024; G01S 1/04; G01S 1/042; G01S 1/08; G01S 5/02; G01S 5/0205; G01S 5/0294; G01S 11/02; G01S 11/04
See application file for complete search history.

(56) References Cited

U.S. PATENT DOCUMENTS

| | | | | | |
|---|---|---|---|---|---|
| 2,407,287 | A | * | 9/1946 | Labin | G01S 1/24 342/387 |
| 2,419,525 | A | * | 4/1947 | Alford | G01S 1/02 342/387 |
| 4,393,382 | A | * | 7/1983 | Jones | G01S 3/14 342/13 |
| 4,558,323 | A | * | 12/1985 | Golinsky | G01S 11/04 235/411 |
| 5,502,450 | A | * | 3/1996 | Zablotney | G01S 3/46 342/451 |
| 6,861,982 | B2 | * | 3/2005 | Forstrom | G01S 5/02 342/387 |
| 6,876,326 | B2 | * | 4/2005 | Martorana | G01S 1/022 342/458 |
| 7,342,536 | B2 | * | 3/2008 | Johnson | G01S 5/0205 342/442 |

* cited by examiner

*Primary Examiner* — Bernarr Gregory

(57) ABSTRACT

A method and devices are disclosed, for tracking a radio beacon from a moving device, while the beacon transmits periodic signals, which the device detects at least at two different locations, and the device provided with information enabling determining the time difference between transmissions of these periodic signals. The method discloses a formula for estimating the angle between the course of the moving device and the beacon: arccos $[c*(TDOA_{12}-TDOT_{12})/baseline_{12}]$; wherein the moving device detects signal 1 and signal 2 respectively at location 1 and location 2, the distance between these locations defined as $baseline_{12}$, $TDOA_{12}$ is the Time Difference of Arrival of the signals at the two locations, $TDOT_{12}$ is the time difference between transmission of these signals, and c is the speed of light.

20 Claims, 13 Drawing Sheets

Block Diagram of Device for Beacon Tracking According to Preferred Embodiment

Figure 1 – GPS Trilateration based on TOA
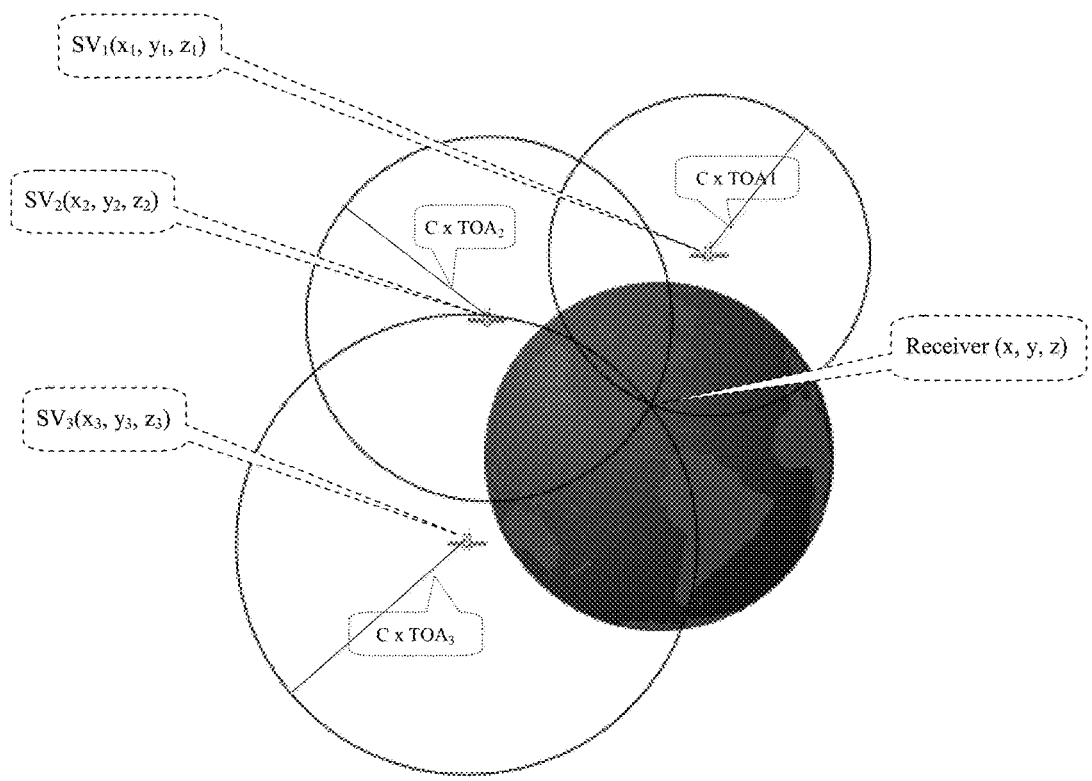
$$\sqrt{[(x-x_1)^2 + (y-y_1)^2 + (z-z_1)^2]} = C \times TOA_1$$
$$\sqrt{[(x-x_2)^2 + (y-y_2)^2 + (z-z_2)^2]} = C \times TOA_2$$
$$\sqrt{[(x-x_3)^2 + (y-y_3)^2 + (z-z_3)^2]} = C \times TOA_3$$

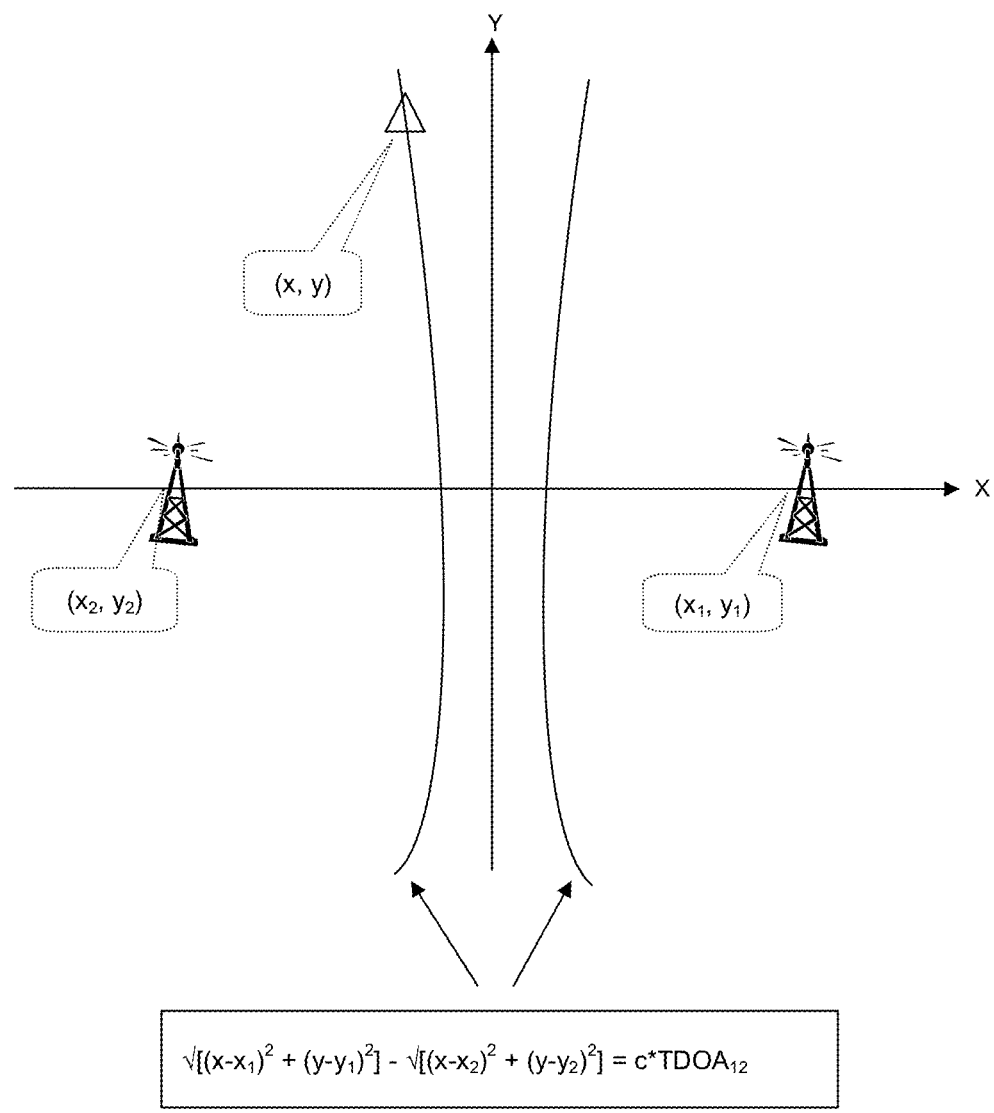
Figure 2 – 2D Hyperbolic Navigation based on TDOA

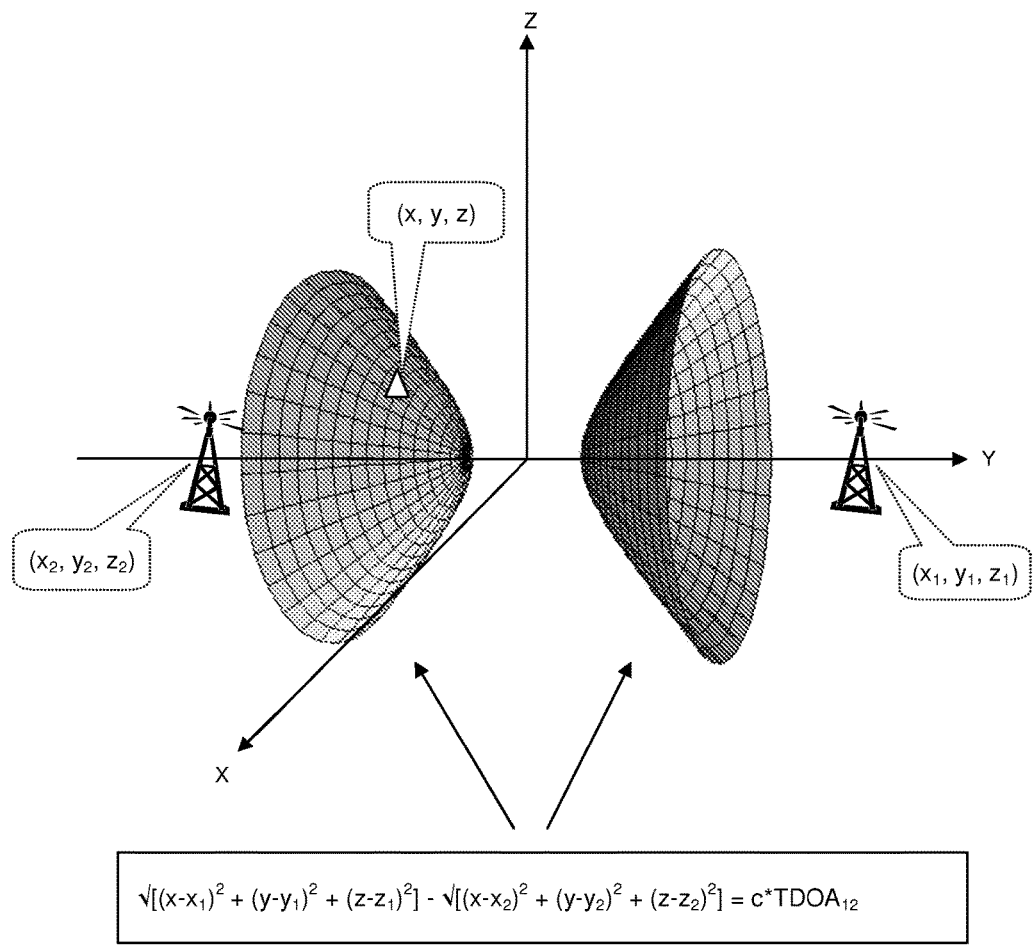
Figure 3 – 3D Hyperbolic Navigation based on TDOA

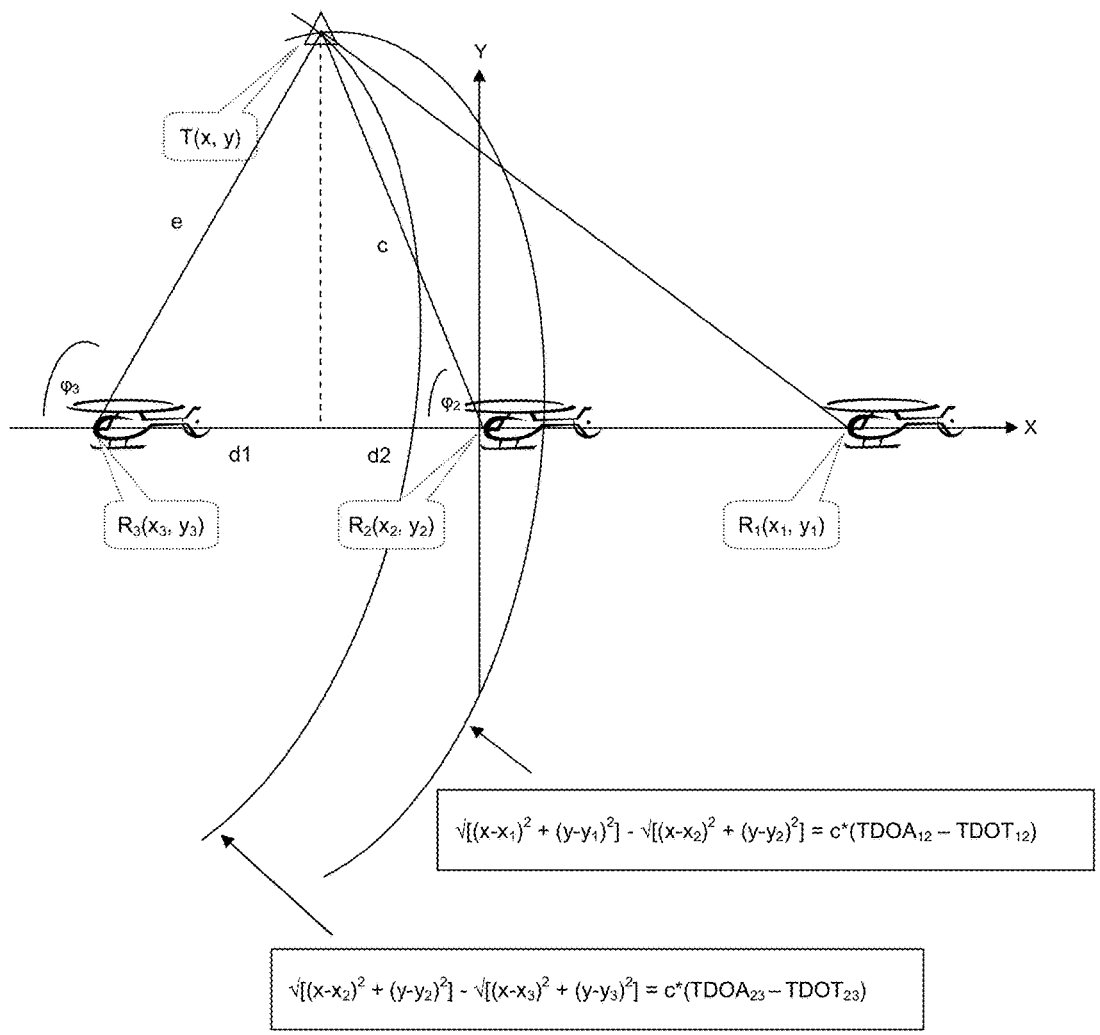
Figure 4 – Moving Receiver Measuring TDOA of Signals Transmitted by Radio Beacon

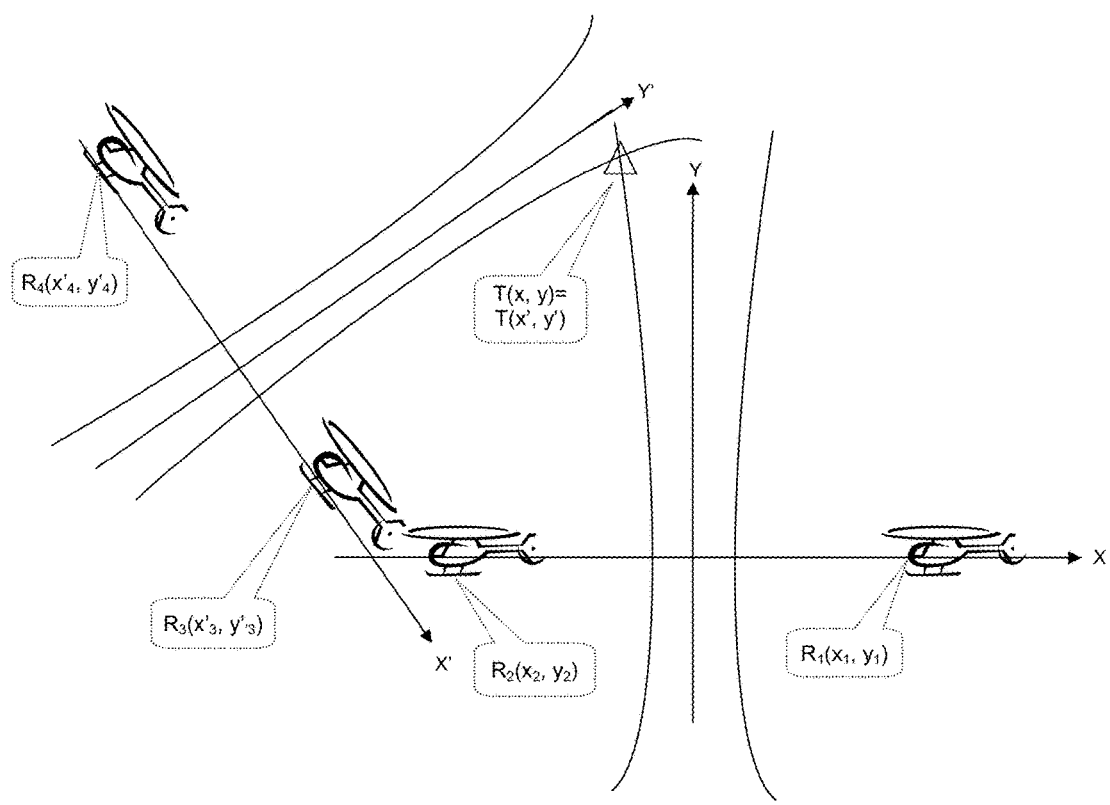
Figure 5 – Low GDOP Hyperbolic Navigation with Moving Receiver
$$x^2/[0.5*c*(TDOA_{12} - TDOT_{12})]^2 - y^2/\{(0.5*R_1R_2)^2 - [0.5*c*(TDOA_{12} - TDOT_{12})]^2\} = 1$$
$$x^2/[0.5*c*(TDOA_{34} - TDOT_{34})]^2 - y^2/\{(0.5*R_3R_4)^2 - [0.5*c*(TDOA_{34} - TDOT_{34})]^2\} = 1$$

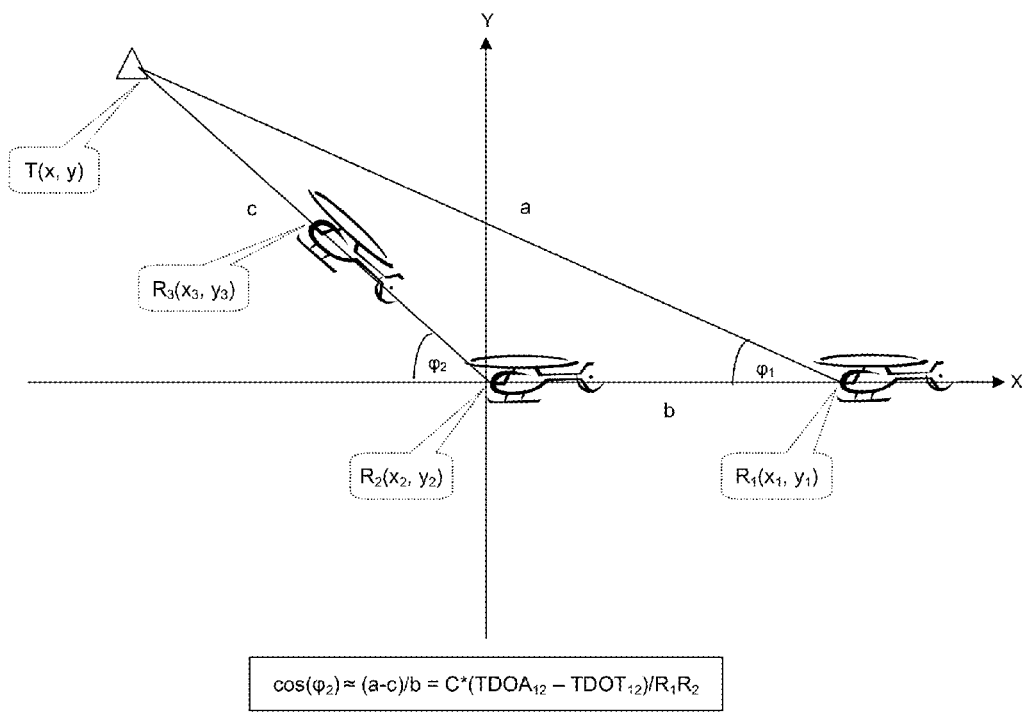
Figure 6 – Determining Direction to a Radio Beacon from a Moving Receiver

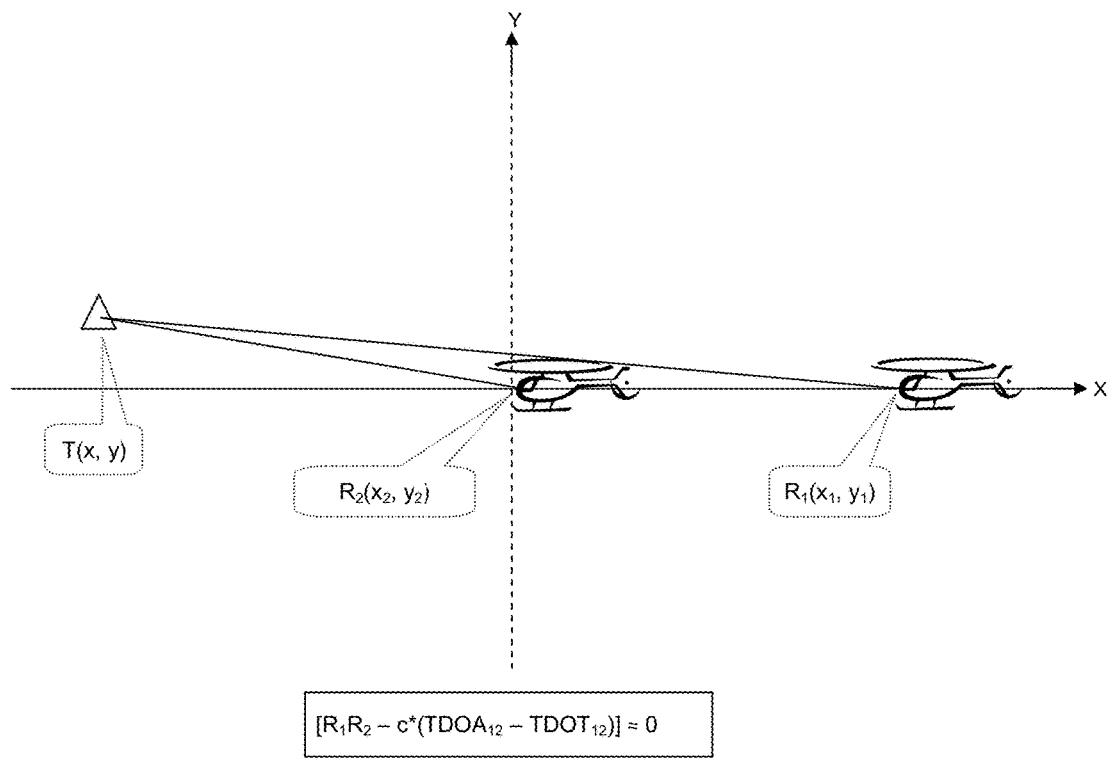
Figure 7 – Receiver Directed to Radio Beacon based on TDOA Measurements Figure 8 – Block Diagram of Device for Beacon Tracking According to Preferred Embodiment
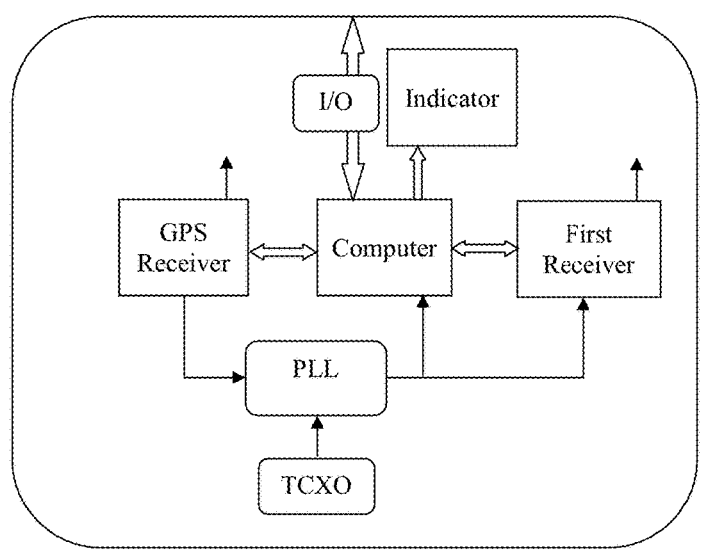

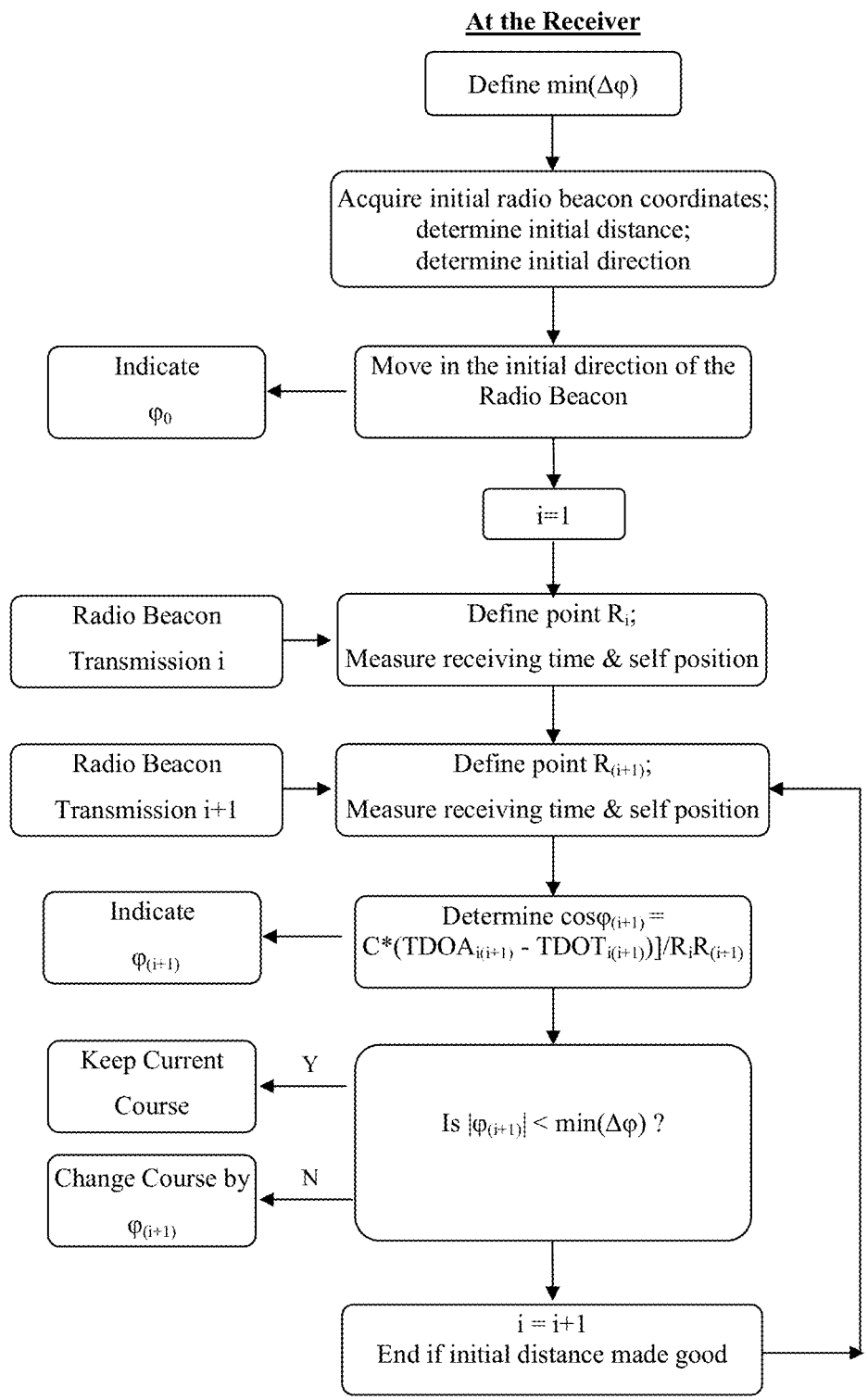
Figure 9 – Flow Chart of Beacon Tracking Process

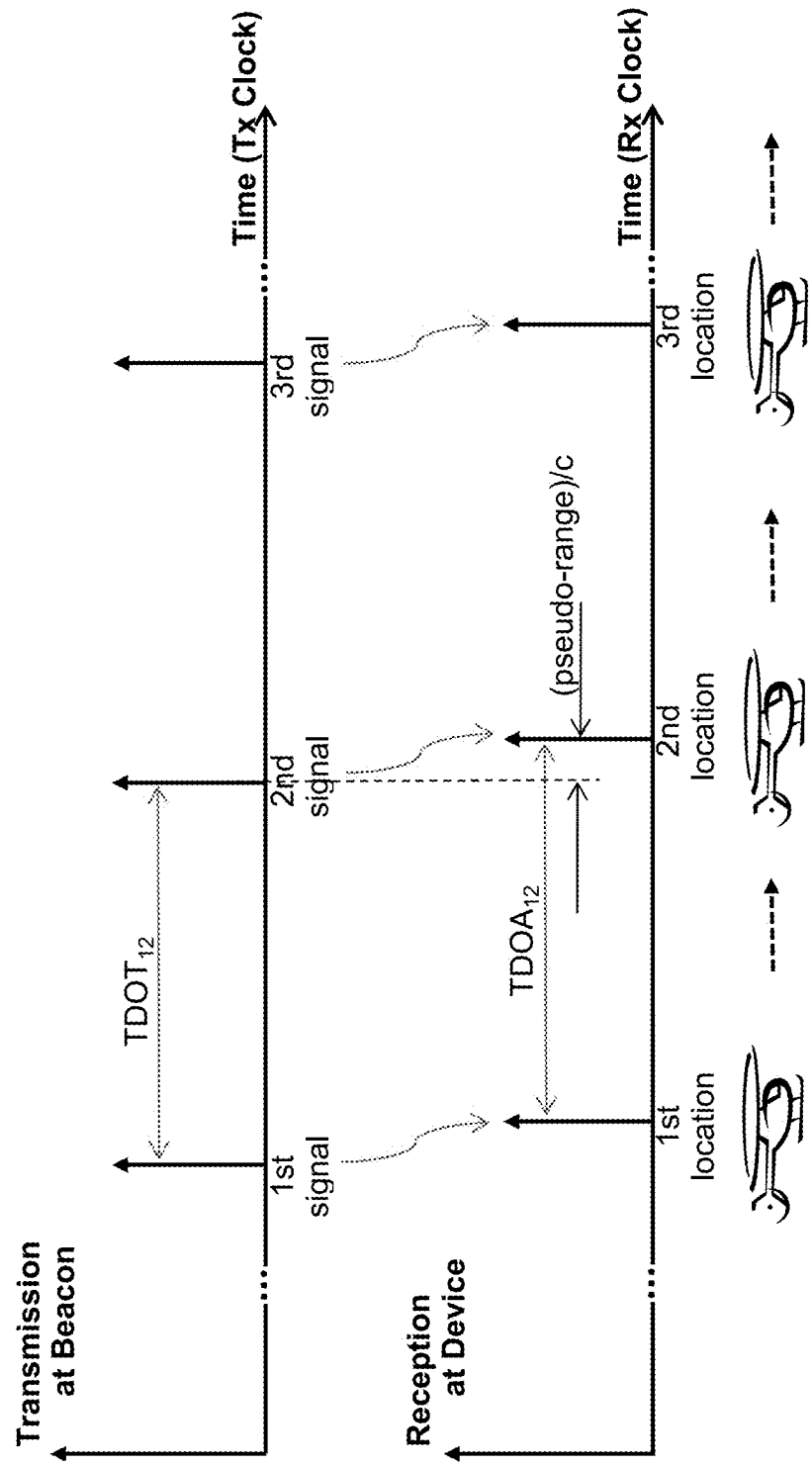

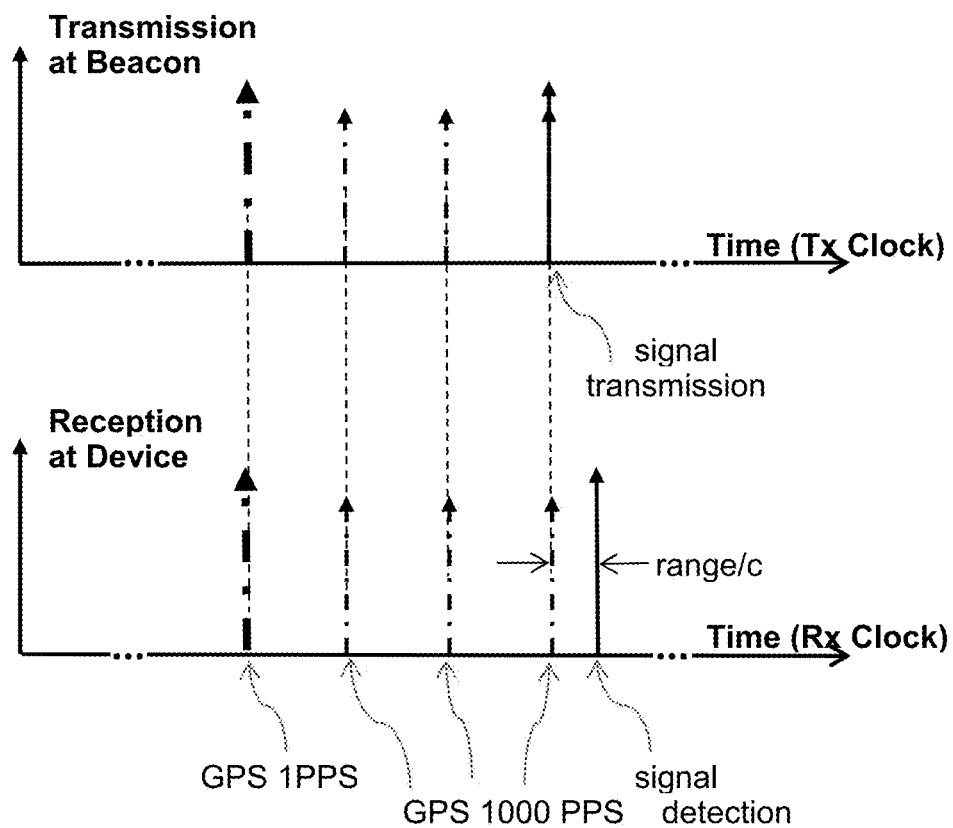
Figure 11 - Transmission and Detection Synchronized with GPS Clock

Figure 12 – Beacon Block Diagram According to 1st Embodiment
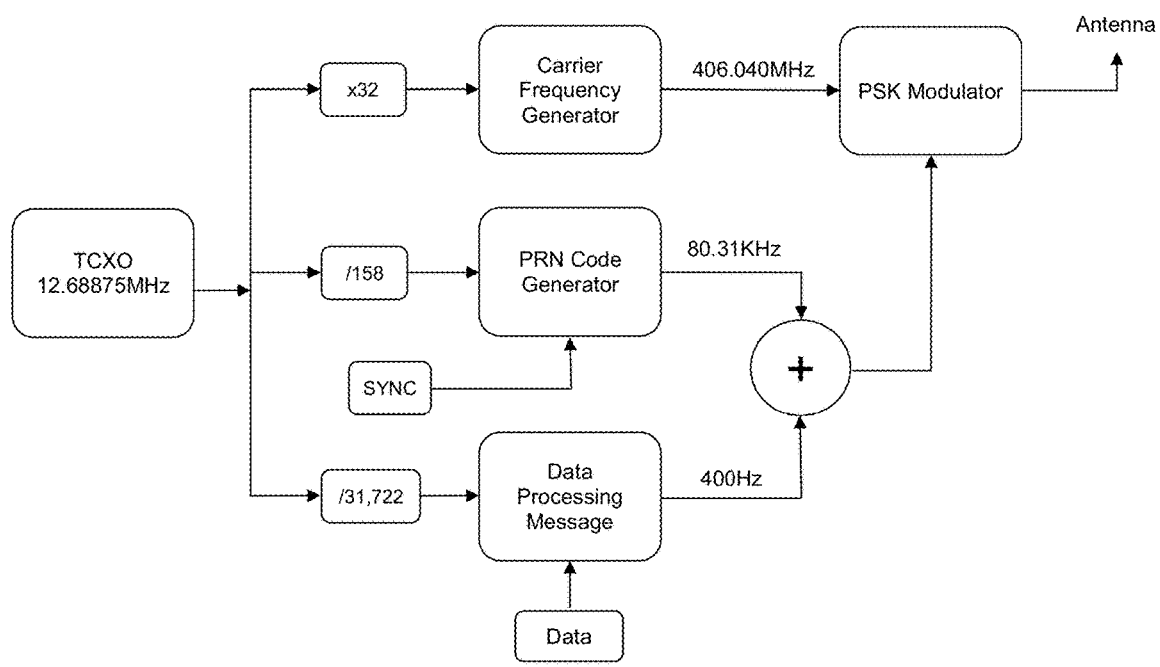

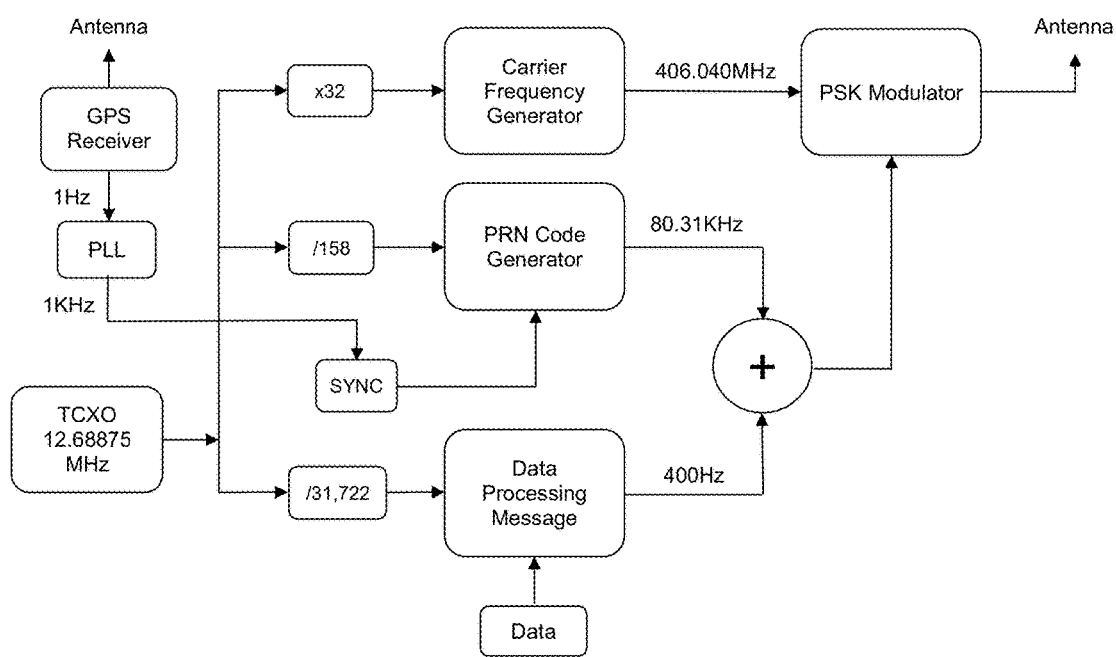
Figure 13 – Beacon Block Diagram According to 2$^{nd}$ Embodiment

TRACKING A RADIO BEACON FROM A MOVING DEVICE

BACKGROUND OF THE INVENTION

The present invention relates to the general art of wireless communications and particularly radio navigation and radio direction finding.

Time of Arrival (TOA) is a well known location determination method in which a receiver calculates its distance to a transmitting beacon based on the time it takes a signal to travel between the transmitter and the receiver, and multiplying this time interval by the signal propagation speed, typically the speed of light. Theoretically, calculating distances to three transmitters, and knowing these transmitters spatial coordinates, enables a receiver to calculate its own spatial coordinates, by resolving three quadratic equations based on the three dimensional Pythagorean theorem. Hence, this method is also known as trilateration, and is the basic algorithm employed by Global Navigation Satellite Systems (GNSS) such as the US GPS, Galileo and Glonass. The geometric representation of this method is of three spheres, each sphere having a transmitting satellite at its origin and a radius of the relevant TOA multiplied by the speed of light, these spheres intersecting and having two common points, wherein the receiver is positioned on one of these points. FIG. 1 illustrates that method in two dimensions. Likewise, three receivers linked together (and time synchronized) can determine the location of a compatible transmitter. The latter method is typically employed by terrestrial cellular systems, wherein a transmitting mobile device is located by a network of several receiving base stations.

Typically, the location determination infrastructure, such as GPS transmitters or cellular base stations, is time synchronized, however not with the terminals—GPS receivers or cellular devices. So since in many cases there is an unknown difference or drift between the time reference (clock) used by the receiver(s) and the transmitter(s), four reference points are required to fix a location, defining four equations accounting for three unknown spatial coordinates plus said unknown time difference. This variation of TOA is then called TDOA—Time Difference of Arrival.

In two dimensions, two receivers measuring the TOA of a signal broadcast by a transmitter, define two intersecting circles, having two common points, said transmitter located on one of these points.

Typically, TOA is calculated by subtracting from the measured receiving time instant, the detected transmitting time instant reported by the transmitter (by data carried on the transmitted signal), and multiplying the TOA by the speed of light (C) provides the range or distance between the transmitter and the receiver. However, if these receivers are synchronized in time with each other, but not with the transmitter, and if the discrepancy between the transmitter clock and the receiver clock is unknown, then this TOA×C provides a pseudo-range or pseudo-distance, which should be corrected accounting for the different time reference employed in the TOA measurement. Still, if two measured TOAs are subtracted from each other, the result is TDOA, which is independent of said clock difference. This TDOA does not represent a circle any more (in 2D, or sphere in 3D), but a hyperbola, since a hyperbola is the locus of points where the (absolute value of the) difference of the distances to two foci (the receivers positions, in our case) is constant. Therefore, the TDOA of a signal transmitted from a specific location and measured by two receivers, defines a Line of Position (LOP) in shape of a hyperbola (with two branches). In order to fix a position, up to an ambiguity of two points, two such LOPs are required, i.e. two TDOA measurements made by two pairs of receivers, possibly selected from three receivers. The 2-D hyperbolic navigation method is illustrated in FIG. 2.

Hyperbolic navigation systems based on terrestrial infrastructure of transmitters were popular during World War II, for fixing the position of a receiver onboard aircraft and ships. Some known hyperbolic navigation systems were: Decca (by the British Navy), Gee (by the Royal Air Force—RAF), LORAN and OMEGA (by the US Navy). Some of these systems employed measurement of time difference, while others were based on phase difference, yet the basic principle was the same. Anyway, these hyperbolic systems became obsolete when the GPS became operational, providing better coverage, availability and accuracy.

In the three dimensional space, two receivers still provide a single TDOA measurement, but the locus of points where the difference of the distances to the two receivers is constant is not a line—hyperbola, as in the two dimensional space, but a plane—hyperboloid.

So if a pulse is emitted from a platform, it will arrive at slightly different times at two spatially separated receiver sites, the TDOA being due to the different distances of each receiver from the platform. Given two receiver locations and a known TDOA, the locus of possible emitter locations is a one half of a two-sheeted hyperboloid, as illustrated in FIG. 3.

So, with two receivers at known locations, an emitter can be located onto a hyperboloid, and the receivers do not need to know the absolute time at which the pulse was transmitted—only the time difference is needed. Then, with a third receiver at a third location, a second TDOA measurement can be acquired and hence locate the emitter on a second hyperboloid. The intersection of these two hyperboloids describes a curve on which the emitter lies. If a fourth receiver is introduced, a third TDOA measurement is available and the intersection of the resulting third hyperboloid with the curve already found with the other three receivers defines a unique point in space. The emitter's location is therefore fully determined in 3D.

In practice, errors in the measurement of the time of arrival of pulses mean that enhanced accuracy can be obtained with more than four receivers. In general, N receivers provide N−1 hyperboloids. When there are N>4 receivers, the N−1 hyperboloids should, assuming a perfect model and measurements, intersect on a single point. In reality, the surfaces rarely intersect, because of various errors. In this case, the location problem can be posed as an optimization problem and solved using, for example, a least squares method or Kalman filter. Additionally, the TDOA of multiple transmitted pulses from a static or quasi-static emitter can be averaged to improve accuracy.

The following two papers provide a mathematical methodic explanation for the 3-D hyperbolic positioning based on TDOA:

Exact Solution of a Three Dimensional Hyperbolic Positioning System

By Ryan Stansifer

Department of Computer Sciences, Florida Institute of Technology, Melbourne, Fla. USA 32901 20 Sep. 2011
http://cs.fit.edu/~ryan/cse4051/projects/multilateration/mult.pdf Exact Solution for Three Dimensional Hyperbolic Positioning Algorithm and Synthesizable VHDL Model for Hardware Implementation By Ralph Bucher New Jersey Center for Wireless and Telecommunication, Department of Electrical and Computer Engineering, New Jersey Institute of Technology http://srbuenaf.webs.ull.cs/potencia/hyperbolic%20location/project.html Present and past TDOA based navigation systems usually employ an infrastructure of radio station that can simultaneously determine the position of a terminal. However, the present art also discloses less dense infrastructure to determine the position of a terminal, wherein a transmitter or receiver of such infrastructure is required to make several measurements at several locations during the fixing process.

U.S. Pat. No. 5,999,129 by Rose discloses a method and system for determining the geolocation—i.e., the latitude, longitude, and altitude—of a stationary RF signal emitter from two or more moving observer aircraft. The observers receive signals from the emitter and the system measures the phase difference between the signals. The observers then perform TOA measurements over a predetermined clock interval, and calculate the TDOA of emitter signals. Based on geometric relationships, the system creates a series of circular lines of position (LOPs) for each observer, and computes hyperbolic LOPs based on the TDOA calculations. The system determines emitter location from the intersection of the hyperbolic LOPs and the circular LOPs.

However, Rose TOA and TDOA methods for position determination of a transmitter require multiple receivers deployed at different locations.

It is therefore an object of the present invention to enable the positioning of a transmitter by a single receiver.

It is also an object of the present invention to enable the positioning of a transmitter by a single receiver, using TDOA and/or TOA measurements.

One specific need for determining the location of a transmitter using a single receiver is related to the location of radio beacons activated by people in distress, by Search and Rescue (SAR) teams.

A radio beacon (or emitter) is a device that allows tracking a ship, aircraft, an animal, or any other individual or asset. Depending on the beacon, particularly its transmitting power, but also the matching receivers or detectors, the tracking range can be as short as some meters or practically worldwide, in case of satellite served beacons.

Distress radio beacons, also known as emergency beacons: EPIRB—Emergency Position-Indicating Radio Beacon (for vessels), ELT—Emergency Locator Transmitter (for airplanes), and PLB—Personal Locator Beacon (carried by individuals), are tracking transmitters which aid in the detection and location of boats, aircraft, and people in distress. In particular, EPIRBs, ELTs and PLBs are radio beacons that interface with the worldwide system of Cospas-Sarsat, the international satellite system for search and rescue (SAR). When manually activated, or automatically activated (upon immersion or collision), such beacons send out periodic distress signals, that are monitored worldwide by the system satellites, and their position is informed to SAR centers that coordinate the actual rescue.

Similar devices in the market, generally called SEND—Satellite Emergency Notification Devices (e.g. SPOT), have more or less a same functionality, yet based on commercial satellite systems.

Among other embodiments and applications, the present invention particularly addresses Cospas-Sarsat (and SEND) beacons and the following elaboration on these beacons should be regarded as a relevant example but not limiting in any way the invention.

The Objective of the Cospas-Sarsat system is to reduce, as far as possible, delays in the provision of distress alerts to SAR services, and the time required locating a distress, and providing assistance, which have a direct impact on the probability of survival of the person in distress at sea or on land.

The Strategy of Cospas-Sarsat is to implement, maintain, co-ordinate and operate a satellite system capable of detecting distress alert transmission from radiobeacons and of determining their position anywhere on the globe. By mid 2014, the Cospas-Sarsat system is comprised of a SAR segment based on LEO (Low Elevation Orbit) satellites, named LEOSAR, and another segment based on GEO (Geostationary) satellites, named GEOSAR. A SAR segment based on MEO (Medium Elevation Orbit) satellites, i.e. MEOSAR, is in development, planned to be fully operational in 2018, wherein these MEO satellites are part of the GPS, Galileo and Glonass constellations.

The future beacon, compatible with the MEOSAR, is expected to emit a direct sequence spread spectrum (DSSS) signal, enabling accurately measuring TOA and TDOA of signals emitted by those beacons, at four satellites, to provide autonomous positioning.

It is then an object of the present invention to use this DSSS communication feature to enable determining accurate TDOA and/or TOA as a way to determine the direction to a beacon and/or the location of a beacon.

A Cospas-Sarsat beacon, when activated, periodically broadcast short bursts on 406 MHz, at about 50 second intervals. These signals are typically detected by the system satellites, relayed to ground stations and then communicated to Rescue Coordination Centres (RCCs), along with a position resolution. The RCC is then responsible to conduct the actual SAR, based on the beacon position provided by the system, typically dispatching SAR teams to the distress site, by helicopters or ships or aircraft. These SAR teams, when arriving at the distress site, are not necessarily in contact with the Cospas-Sarsat system, or might not have updates on the beacon position, so need an autonomous way of locating the beacon, which might have drifted away from the last position known by the system.

Thus, though not part of the international Cospas-Sarsat standard (rather a national requirement), most 406 MHz beacons comprise an auxiliary short range transmitter operating on 121.5 MHz (civil use) or 243 MHz (military use). This auxiliary transmitter, known also as "homing transmitter" or "homer", simply transmits at a low power, an anonymous siren tone, enabling direction finding (DF), i.e. home in on the source of the transmission.

However, Direction (or Directional) Finding of a simple RF carrier is a technology with substantial weakness. A major drawback is related to the relatively complex equipment and operational limitations and skills required at the searching side. DF typically requires directional antennas, which unless stable, cannot provide great accuracy, so quite limited in operation onboard a rolling/yawing/pitching vessel. Alternatively, more sophisticated DF antennas could be used, such as rotatable and stabilized antennas, or phased arrays, yet those are typically expensive, large, and require substantial electrical power, not quite practical for a small vessel or helicopter to carry. It also should be noted that in many cases small and private vessels are engaged in SAR, either coordinated by the RCC (which may order any vessel to assist in SAR), or upon a local accident as Man over Board (MOB).

It is then another object of the present invention to enable short range location of radio beacons by a single and simple receiver, without the need for a directional antenna, enabling an affordable, simple to install and easy to operate detecting device onboard leisure vessels.

It is still another object of the present invention to enable tracking radio beacons, such as Cospas-Sarsat EPIRB, ELT, or PLB, by SAR personnel, more efficiently than presently done.

It is yet also an object of the present invention to enable efficient tracking of a Cospas-Sarsat beacon at the beacon location, avoiding a homing transmitter, and not violating the beacon specifications.

A particular situation that the present invention addresses is the notorious Man overboard (MOB) or Person overboard (POB) accident. Man overboard is a situation in which a person has fallen from a boat or ship into the water and is in need of rescue. People may fall overboard for many reasons: they might have been struck by a part of the ship, they may lose their footing due to a slippery deck or an unexpected movement of the boat, or any number of other reasons. Falling overboard is one of the most dangerous and life-threatening things that can happen at sea. This is especially so from a large vessel that is slow to maneuver, or from a short-handed smaller boat. When single-handed and using self-steering gear it is usually fatal. Thousands of people are lost at sea every year due to MOB. Fast detection and location of such accidents is crucial, since survival time in water is short, typically under 6 hours at 10° C.

Technology can be used to assist in the retrieval of people who fall overboard. Many GPS chart plotters designed for marine use have a Man Overboard button (MOB). This button is to be pushed as soon as a Man Overboard alarm is raised, causing the plotter to record the latest known position of the person overboard. This allows the boat to be easily returned to the fallen person even if visual contact is lost.

Several manufacturers make man overboard alarms which can automatically detect a man overboard incident. The hardware consists of individual units worn by each crew member, and a base unit installed onboard. Some systems are water activated: when an individual unit comes in contact with water, it sends a signal to the base unit, which sounds the man overboard alarm. Other automatic detection systems rely on a constant radio signal being transmitted between an individual unit and the base unit; passing outside the transmission range of the individual unit and/or falling into the water causes the radio signal to degrade severely, which makes the base unit sound the man overboard alarm. Yet, present MOB alert devices, also known as Marine Survivor Locating Devices (MSLD), do not transmit data indicating their position, and as the victim drifts away, even the onboard record of last known position of the MOB becomes obsolete. At high seas and low visibility conditions, locating a MOB becomes a significant challenge.

MSLDs typically do not employ GPS, which is not efficient due to the fast and unexpected nature of MOB accidents, and the fact that almost all the victim body is typically in the water, and his/her hands (as well as the wrist worn MSLD) are typically engaged in swimming to survive in the water. Thus, most MSLDs are not based on GNSS but rather on simple low power RF emission that can be detected as long as the MSLD is onboard or up to about 100 meters away. So the burden of locating an MSLD is typically put on the searching side.

Indeed, some modern MSLDs employ AIS (Automatic Identification System) or DSC (Digital Selective Calling) transmitters, practically because many vessels are already equipped with AIS or DSC receivers, however the location data provided by AIS and DSC transmitters is based on GPS embedded receivers, and if those cannot fix the MSLD position since the GPS antenna is immersed in the water and do not allow a cold start of the GNSS algorithm, typically requiring about 30 seconds of uninterrupted satellite reception, then no valid position can be delivered by the MSLD.

It is then another object of the present invention to enable more efficient location of a Marine Survivor Locating Device, by enabling the communication of reliable and accurate location information that can be acquired and updated quickly even at extreme conditions that downgrade wireless communications, such that are typical to MOB accidents, devices that are comfortable enough to carry and affordable to purchase by every mariner.

Therefore, it is still another object of the present invention to enable MSLD detecting devices, to be installed onboard even small vessels, devices that are compact in size and low power consuming and low in cost, and easily operated even by the non professionals.

U.S. Pat. No. 7,711,375 by Liu discloses a Method and system for determining a location of a wireless transmitting device and guiding the search for the same.

Liu discloses determining the location of a wireless transmitting device using a movable detection station . . . receiving the transmitted signals . . . by said movable detection station . . . measurements at a plurality of positions of said movable detection station . . . determining at least one of the location and orientation of said movable detection station at each of said positions . . . performing estimation of the location of said wireless transmitting device . . . .

Further, Liu discloses measurement of delay of the signal propagation, from said wireless transmitting device to said movable detection station . . . measurement of difference of the signal propagation delays, from said wireless transmitting device to said movable detection station . . . wherein the difference of delays is between pairs of said positions of said movable detection station . . . .

U.S. Pat. Nos. 7,616,155 and 7,804,448 by Bull disclose Portable iterative geolocation of RF emitters.

Bull discloses a method for locating an emitter of interest (EOI) using at least one portable geolocation sensor . . . receive, time stamp and store EOI transmissions during a first period of time; moving the first portable geolocation sensor to a second location; at the second location, using the first portable geolocation sensor to receive, time stamp and store EOI transmissions during a second period of time; and computing the location of the EOI using data representative of the EOI transmissions stored during said first and second periods of time . . . .

Yet Liu and Bull are focused on location finding rather than on direction finding, and also fail to disclose transmission of periodic signals. Liu and Bull still fail to disclose providing information enabling determining the time difference between transmissions (TDOT), which could be instrumental for calculating the time difference of arrival (TDOA). Liu and Bull also fail to disclose specific formulae for determining the direction to a radio beacon (wireless transmitting device in Liu's language or RF emitter of interest—EOI, in Bull's language) while substantially moving in that direction, a scenario that is typical to beacon tracking, yet presents significant geometric dilution of precision (GDOP) for TDOA and TOA based navigation, sometimes making present art hyperbolic/trilateral navigation inaccurate to be practical.

As known in the art, Dilution of precision (DOP), or geometric dilution of precision (GDOP), or Position Dilution of Precision (PDOP) are terms used in radio navigation to specify the additional multiplicative effect of the system transmitters and receivers geometry on positional measurement precision. Basically, PDOP can be interpreted as 1/(volume of a tetrahedron, formed by the positions of the radio beacon and detecting receivers), so the best geometrical situation occurs when that volume is at a maximum and PDOP at a minimum. On the other side, when the beacon and receivers are on a same line, the volume of this tetrahedron is zero and PDOP is infinitely large.

An aspect of the DOP is reflected in the algebraic formulae of present art TDOA and TOA equations. As known in the art, the TDOA of a signal at two locations (1 and 2, forming baseline$_{12}$) is associated with a hyperbola that defines a certain relationship between the x and y coordinates of the transmitter's position, such hyperbola providing a Line of Position—LOP on which the transmitter is positioned. Similarly, the TDOA of that signal detected at two other locations (3 and 4, forming baseline$_{34}$), is associated with another hyperbola that defines a second relationship between the x and y coordinates of that transmitter, hence a second LOP. Geometrically, the transmitter should be placed on the intersection of these two LOPs; algebraically, these TDOA measurements provide the quadratic equations of:

$$x^2/(0.5*c*TDOA_{12})^2 - y^2/[(0.5*baseline_{12})^2 - (0.5*c*TDOA_{12})^2] = 1 \quad (1)$$

$$x^2/(0.5*c*TDOA_{34})^2 - y^2/[(0.5*baseline_{34})^2 - (0.5*c*TDOA_{34})^2] = 1 \quad (2)$$

However, if baseline$_{12}$ is in line with the transmitter, then baseline$_{12}$=c*TDOA$_{12}$, thus at equation (1) a zero appears in the denominator (under y$^2$) and the hyperbola is undefined on that line. In case that baseline$_{34}$ is in line with the transmitter, then at equation (2) a zero appears in the denominator.

The PDOP issue is also relevant to TOA measurements, i.e. when the locus of points meeting a radio navigation measurement is a circle (in 2D, and sphere in 3D). Considering two receivers forming a baseline which is in line with a radio beacon to be positioned, then TOA measurements made by these receivers define two circles on which the radio beacon is positioned, however these circles do not cross each other but have a single tangential point, and in the presence of even low noise or slight measurement error, might have no common point at all. The algebraic representation of such degenerated case is of two dependent (or inconsistent) quadratic navigation equations that do not provide two pairs of solutions for the beacon coordinates (x, y) as in the general case, but either an infinite number of solutions (circles overlap) or no solution at all (circles do not intersect).

It should be noted that for simplicity, the present analysis is done in 2D, yet the mathematical representation of 3D hyperbolic (i.e. hyperboloid) navigation based on TDOA is well known in the art (and so is the case with TOA navigation providing 2D circles and 3D spheres), as described in the two papers indicated above, so persons skilled in the art can easily migrate from 2D equations to 3D equations.

So it is a further object of the present invention to enable determining the location of a radio beacon employing a single receiver in TDOA/TOA measurements, while moving in the direction of the beacon. Such a need is typically important when it is required to physically arrive at the beacon using said receiver, as in SAR operations, where it is particularly paramount to arrive quickly at the beacon.

Essentially, it is another object of the present invention to enable determining the direction to a radio beacon employing a single receiver in TDOA/TOA measurements, while moving in that direction.

It is an additional object of the present invention to enable small and low power (operated on small batteries) and low cost devices attached to people, animals or any other asset or object, to send data that may assist in the location thereof, even where or when no GNSS signals are available.

Other objects and advantages of the invention will become apparent as the description proceeds.

SUMMARY OF THE INVENTION

The present invention discloses a method for tracking a radio beacon from a moving device, comprising the steps of:
a. at said radio beacon transmitting periodic signals;
b. providing said device with information enabling determining at least the time difference (TDOT$_{12}$) between transmission time of a first signal and transmission time of a second signal, said first and second signals been part of said periodic signals;
c. at said device, at a first location, determining the location coordinates, and a receiving time of said first signal;
d. at said device, at a second location, determining the location coordinates, and a receiving time of said second signal;
e. at said device, determining the time difference (TDOA$_{12}$) between the receiving time instant of said first signal and the receiving time instant of said second signal, and the distance (baseline$_{12}$) between said first and second locations;
f. at said device, determining a direction to said radio beacon, from said TDOT$_{12}$, TDOA$_{12}$ and baseline$_{12}$.

The general transmission time schedule of the radio beacon is not dictated by the present invention; it is assumed that the beacon transmits periodically, i.e. from time to time, however according to the present invention those periods can be equal, or not; furthermore, any specific or all those time periods may be configured to any desired value.

According to a preferred embodiment of the invention, the radio beacon is configured to broadcast a short signal of about 0.5 s, every 50 seconds in average, wherein the actual time between successive transmissions is pseudo-randomly distributed in the range of 47.5-52.5 s, according to the Cospas-Sarsat specifications T.001 & T.007 (which can be found at—www.cospas-sarsat.org). According to this standard, consecutive transmissions are scheduled every 50±2.5 s, however the exact transmission time instant of the signal is undefined.

Preferably, the radio beacon periodically broadcast an RF signal modulated by two series of data: a low bit rate message carrying dynamic information, e.g. specifying the beacon location coordinates, according to a format known to the receiving device (the latter may be referred to, in this document, as the "device" or "mobile device" or "portable device" or "detector" or "receiver" or "receiving device" or "moving receiver", etc.); in addition, a high bit (also known in the art as "chip") rate spreading sequence (also known as PRN—Pseudo Random Noise) preferably modulates the signal, enabling accurate time and distance measurements. The time measurement resolution is usually proportional to this chip rate, typically about 1% of the chip rate, so a chip rate of 100 Kcps may enable time measurement resolution of about 1%*(1/100 K)s=0.1 μs, which as persons skilled in the art know, corresponds to a pseudo-range resolution of c*0.1

μs=30 m. Such double modulation is employed in GNSS navigation signals, particularly the US GPS, and published in the system Interface Control Documents (ICDs). Moreover, such modulation scheme, known also as Direct Sequence Spread Spectrum—DSSS, is planned for the second generation of the Cospas-Sarsat beacons (Second Generation Beacon—SGB), being part of the MEOSAR, as elaborated in the background section. The preferred embodiment of the present invention is therefore addressing this Cospas-Sarsat SGB, and though its final specifications are not yet released and might change, the DSSS modulation, known also as WB (wideband) in the context of Cospas-Sarsat (opposed to present NB—Narrow band signal), is referred here as a possible embodiment for time measuring and pseudo-range calculation between two points. Possibly, the detecting device may be carried onboard one of the MEOSAR satellites, enabling determining the beacon position by a single satellite.

The structure of a receiver required to detect such DSSS signals and accurately measure the receiving time is also well known in the art, typically based on generating a local replica of the transmitted PRN sequence, which pattern is known in advance at the receiver, and searching for auto-correlation between the local replica and the received signal, to determine its received phase, accounting also for clock differences and Doppler frequency shift between the transmitter and the receiver. Such is assumed to be basically employed according to a preferred embodiment of the invention, although the specific structure of the receiver is indifferent in the scope of the present invention, as long as it enables measuring the receiving time instant.

The clock for determining the receiving time instant is preferably accurate in frequency and synchronized in phase with the transmission generating clock, however these are not a must. As persons skilled in the art probably know, TDOA methods, as those referred to in the present invention, are particularly immune to clock drifts between transmitter and receiver, while TOA methods are usually based on synchronized clocks. The present invention addresses the two, however in its more general embodiment it does not assume clock synchronization between beacon and detecting receiver. Practically, considering low power consuming and low cost radio beacons, a transmission clock based on a TCXO (Temperature Compensated Crystal Oscillator) may be considered, and so at the receiver, such that a clock drift of several ppm (parts per million) may be assumed, according to a preferred embodiment of the invention.

The clock phase of the transmission may just refer to a local Time of Day (TOD) counter administered by the radio beacon, or preferably refer to a globally acquirable clock and TOD such as the GPS time. Furthermore, the present invention allows changing this clock phase reference, as long as such a change at the transmitter is known in advance or reported to the receiver. For example, the beacon may report the transmission time relatively to the previous transmission, which is good enough for TDOA measurements, assuming that the transmission clock frequency is substantially stable between consecutive transmissions (known as short term stability), and that the beacon is almost static with respect to the detecting device. Practically, assuming a relative speed of 100 m/s (360 Kmh) between transmitter and receiver, the Doppler shift is $100/(3*10^8) \approx 0.3$ ppm, which is quite neglectable.

The present invention discloses providing the portable device with information enabling determining the time difference between a transmission time instant of a first signal and a transmission time instant of a second signal, said first and second signals been part of the periodic signals transmitted by the beacon. This can be done in several ways, either based on information provided at the receiver in advance, or communicated in real time from the beacon, or even related to external factors such as the GPS time of day.

The probably simplest way to provide the time between consecutive transmissions to the receiver is to configure the beacon to transmit at fixed intervals, and provide the receiver with that information either in advance, configuring the receiver accordingly or alternatively in real time, communicating the relevant information from the beacon. Obviously, fixing this time period and providing the receiver in advance with this fixed value is preferable as this does not require any additional messaging between the beacon and the receiving device. However, it could be useful to keep a degree of freedom at the beacon, having the flexibility to change the time period between successive transmissions in real time, for example due to operational inputs such as receiving an acknowledgement (then logically reducing the transmission repetition rate); then it would be required to communicate the change in time period from the beacon to detecting devices.

Yet, as indicated before, the Cospas-Sarsat standard does not allow a fix transmission interval, in order to avoid a continuous conflict between unwanted synchronized transmissions of several beacons.

Thus, according to the preferred embodiment of the present invention, the time interval between consecutive transmissions (i.e. signals) is 47.5-52.5 s as specified in Cospas-Sarsat T.001 & T.007 documents, just that periodically, the present invention discloses to set a certain time period between a pair of signals, to a value known in advance at the receiving device (or alternatively communicated to the device). Then, according to a possible approach, once per ~5 minutes, i.e. every 6 transmissions, an interval between successive transmissions is set exactly to 50 seconds. Alternatively, this time period between a pair of signals, hereafter named "calibration interval" or "TDOA interval", is not equally set for all beacons; however its value is related to data carried by the signal, e.g. the beacon Identification Number (ID) which is indicated in the modulated message.

Then this calibration interval could be set to 50 s+0.5 s*[(3 LSB of ID)−3.5], wherein LSB means Least Significant Bits, in order to provide some kind of variation among different beacons. For example, if the three least significant bits of a beacon ID are 000, the calibration interval is configured to 50+0.5*(0−3.5)s=48.25 s; and for all possible values of ID:

50−0.5*3.5 s=48.25 s for ID= . . . 000;

50−0.5*2.5 s=48.75 s for ID= . . . 001;

50−0.5*1.5 s=49.25 s for ID= . . . 010;

50−0.5*0.5 s=49.75 s for ID= . . . 011;

50+0.5*0.5 s=50.25 s for ID= . . . 100;

50+0.5*1.5 s=50.75 s for ID= . . . 101;

50+0.5*2.5 s=51.25 s for ID= . . . 110;

50+0.5*3.5 s=51.75 s for ID= . . . 111.

So accordingly, one out of six intervals between consecutive transmissions (TDOT), i.e. every five minutes in average, is set at the beacon either to exactly 50 s, or in relation to the beacon ID. Then, if the receiving device can identify these calibration intervals, and knowing the TDOT associated with the identified interval, this may assist determining the direction to the beacon.

Still, how does the receiving device identify the calibration interval?

The simplest way to communicate this information to the receiver would be by allocating a specific bit in the message payload indicating: "0"-regular interval; "1"-TDOA interval.

Yet, an additional bit could sometimes be difficult to allocate, in a compact message, so an alternative approach is based on the case where the radio beacon and the detecting receiver are embedded with a GPS receiver, thus both devices may refer to a same time reference—the GPS clock and Time of Day. Then, both the beacon and the detecting device are configured, for example, such that the first of the pair of signals defining the TDOA calibration interval is transmitted immediately after the GPS TOD reads 5 minutes multiplied by an integer number, i.e. 0 min, 5 min, 10 min, etc. Since both the beacon and detecting device simultaneously read that event, no matter how distant they are from one another, the specific selection of calibration period will be communicated from the beacon to the detecting device.

In this context, persons skilled in the art probably appreciate that the GPS clock and TOD can be acquired by a GPS receiver even with only a single satellite in view, much easier than acquiring a position which requires 4 satellites in view and takes longer time.

Furthermore, if both the beacon and the detecting device agree in advance that one of six intervals between consecutive transmissions is a TDOA interval, e.g. set exactly to 50 s, then the detecting device may practically identify that interval autonomously, based on some assumptions. The first assumption is that the time period between successive transmissions at the beacon is configured in a resolution not finer than 0.25 s (for example). This makes sense in Cospas-Sarsat beacons since the reason for specifying a pseudo-random interval (a logic applicable in other systems as well) is to avoid a continuous conflict between different active beacons, and since the transmitted signal duration is about 0.5 s, then such is more or less the step required to move one signal away from another. Accordingly, permitted TDOTs are 50 s±0.25 s*n, where n=0, 1, 2, . . . , 10. Another assumption is that the maximum operating distance between beacon and detecting device is 1000 Km (for example). This is quite a conservative assumption considering the limited transmission power of a beacon (5 w for a standard Cospas-Sarsat beacon) and non line of sight conditions due to earth curvature (for non satellite-borne detecting devices). At 1000 Km, the TOA of a radio signal is [1000/300,000] sec=3.3 ms, so for a calibration interval of TDOT=50 s, the measured TDOA should be in the range of 50 s−3.3 ms to 50 s+3.3 ms. But this measurement is expected only for TDOT=50 s, while even for the nearest TDOT=50.25 s, the measured TDOA would be in the range of 50.247-50.253 s, which has no common value with TDOA in the range of 49.997-50.003 s associated with TDOT=50 s. So according to this example, the detecting device is configured to measure every TDOA between consecutive signal receptions, and when detecting a TDOA in the range of 49.997-50.003 s, consider this as a calibration interval bearing TDOT=50 s.

Actually, under these assumptions, there is even no need to define in advance how frequent is this calibration interval employed, as whenever a calibration interval is used, at the beacon, the receiving device can detect and identify it and associate it with a specific TDOT.

In fact, it is possible for the receiving device to detect and identify a calibration interval, and associate it with a specific TDOT, even if the TDOT of a calibration interval is not pre-defined or communicated to the receiving device. This can be done by permitting a TDOT only in form of m*ΔT, wherein m is an integer number and ΔT is a time interval greater than the maximum operating range divided by the speed of light. According to the above example, this condition is met by far for ΔT=0.25 s and a maximum range of 1000 Km, since ΔT=250 ms>1000 Km/c=3.3 ms.

Hence, limiting TDOT to a minimum resolution, creates time distances between permitted TDOTs greater than the maximum propagation delay, enabling distinguishing between time delays due to different TDOT and time delays due to different locations of the receiving device with respect to the transmitting beacon. Such quantization of permitted TDOTs may resemble, as a person skilled in the art may appreciate, the Hamming distances in forward error correction (FEC) coding theory.

Furthermore, once it was agreed upon, at the beacon and at the detecting device, that the minimum difference between any two (not identical) TDOTs of said periodic signals is ΔT, then this can be considered as providing said device with information enabling determining the time difference ($TDOT_{12}$) between transmission of a first and a second signal, since for an operating range not greater than ΔT*c, it is possible, at the detecting device, to identify the TDOT related to any pair of detected signals, just upon analyzing the measured TDOAs.

For example, it could be pre-defined that no specific calibration intervals are configured, just that the permitted TDOT between any two consecutive signal transmissions is ΔT*m, wherein m is an integer and ΔT=1 ms. Specifically, for example, permitted TDOTs are: 50 s±1 ms*n, where n=0, 1, 2, . . . , 2500. Then, ΔT=1 ms determines a maximum operating range of c*1 ms=300 Km, and restricted to this maximum range, if at the detecting device $TDOA_{12}$ is measured and determined, for example, at a range of 50 s+1 ms*3±150 μsec, then it is clear that TDOT=50 s+1 ms*3, and those up to 150 μs are delays due to difference in distance rather than difference in transmission time.

Moreover, no assumptions are required regarding the operating range, if $\Delta T > baseline_{12}/c$. Since it is clear that $|c*(TDOA_{12}-TDOT_{12})| < baseline_{12}$ (based on the triangle inequality theorem and further elaborated in the detailed description section), then $\Delta T > |TDOA_{12}-TDOT_{12}|$ so the detecting device can determine that: $TDOA_{12} + \Delta T > TDOT_{12} = m*\Delta T > TDOA_{12} - \Delta T$, based on the measured $TDOA_{12}$ and the known ΔT.

For example, if $baseline_{12} < 30$ Km (which is quite conservative, considering travelling this distance in 52.5 s and at less than 2000 Km/h), then: $(TDOA_{12}+100 \mu s) > TDOT_{12} > (TDOA_{12}-100 \mu s)$. So if the measured $TDOA_{12}$ is 50.004050 s, e.g., it would be wrong to interpret $TDOA_{12}$=50 s+3 ms+1050 μs, and determine $TDOT_{12}$=50 s+1 ms*3, since $TDOA_{12}$ should not be more than 100 μs apart from a permitted $TDOT_{12}$, then the right interpretation is $TDOA_{12}$=50 s+1 ms*4+50 μsec, and $TDOT_{12}$=50 s+1 ms*4=50.004 s.

Another way for providing the detecting device with information enabling determining the time difference between transmissions of two signals is configuring the transmitted signal to carry data specifying the transmission time thereof.

As persons skilled in the art appreciate, encoding the transmission time in the transmitted signal is a technique quite known and practiced in the art, for example in GNSS.

The GPS signal, in particular, carries a series of bits collectively named the "navigation message", containing data specifying the transmission time instant, measured with respect to a specific predefined bit edge in this message. Due to the low rate of these bits, for accurate time determination (and for other reasons), another signal is modulated on the GPS carrier, the PRN, higher in speed, pre-defined in pattern, and synchronized in time with the navigation message bits. This double modulation scheme enables accurate time determination at the receiver, typically equivalent to 3-5 meters in pseudo-range. This GPS technique may also serve in the present invention.

The Cospas-Sarsat beacon signal also carries a message, which may be suitable to specify the transmission time as well, assuming that a spreading sequence will also be applied on that signal. Considering that the time difference between successive transmissions is 47.5-52.5 s, it is possible to encode the time beyond the minimum of 47.5 s, and up to the maximum of 52.5 s, at a resolution of 0.1 µs, with 26 bits. This approach will enable a spatial resolution of 0.1 µ*C=30 m, and dynamic range of 5 s*C=1,500,000 Km, obviously far beyond any practical needs.

However, preferably, the transmission time instants and receiving time instants may be determined with respect to a same time reference, such as the GPS time. In this case, the time transmission may be encoded in reference to the last rising edge of the GPS 1 PPS (pulse per second) signal. Furthermore, if a smaller dynamic range is sufficient (or considering a limitation on $baseline_{12}/c$ as discussed earlier), such as 300 Km, then fewer bits are required. It is then possible to use a 1 KHz clock synchronized to the GPS clock and report the distance in time to the latest rising edge, using 14 bits and still providing a dynamic range of 1 ms*c=300 Km, and resolution of 30 m, in 0.1 µs steps. As discussed earlier, since ΔT=1 ms>100 µs, then this scheme may well suit if $baseline_{12}$<30 Km, not limiting the operating range.

By now, it is clear that the receiving device, upon detecting signals 1 and 2 transmitted by the beacon, respectively at locations 1 and 2, can determine the time $TDOA_{12}$ between receiving these signals, and if provided with data enabling determining the time $TDOT_{12}$ between transmission of signals 1 and 2, then normalize $TDOA_{12}$ according to $TDOT_{12}$, accounting for the late time of transmission of the second signal with respect to the first signal, by a simple subtraction.

Then, upon measuring the distance ($baseline_{12}$) travelled between those two receiving locations, the detecting device may define one LOP, a hyperbola, on which the beacon is positioned, assuming that the beacon almost did not change its location between the time signals 1 and 2 were transmitted.

For determining the location of the beacon two LOPs are required, as reflected in equations (1) and (2).

Yet, the present invention discloses also estimating the direction to the beacon, based on single baseline measurements, i.e. $TDOT_{12}$, $TDOA_{12}$ and $baseline_{12}$. Hence, the direction from the second location to the beacon, relatively to the direction from the first location to the second location, is estimated as an angle of: $\arccos[c*(TDOA_{12}-TDOT_{12})/baseline_{12}]$; wherein c is the speed of light.

This estimation, which will be elaborated in the detailed description section, is particularly valid when $baseline_{12}$ is relatively short with respect to the distance of the detecting device from the beacon.

Further, the invention discloses a criterion for indicating if a baseline is directed towards the beacon, as in many cases it is required to operate the detecting device while moving towards the beacon, for example searching to rescue a person who activated this beacon. Hence, at a first location, determining the direction to a second location such that $[baseline_{12}-c*(TDOA_{12}-TDOT_{12})]$ is substantially small.

As explained in the detailed description section, in general $[baseline_{12}-c*(TDOA_{12}-TDOT_{12})]\geq0$, and particularly $[baseline_{12}-c*(TDOA_{12}-TDOT_{12})]=0$ if $baseline_{12}$ is in line with the beacon, indicating that the detecting device is in the right direction tracking the beacon. It should be noted that for a given first location, the exact second location is not necessarily determined at the detecting device, since the exact receiving time of the second signal might be yet unknown, however the direction to that second point can be determined, which is also the estimated direction to the beacon.

It should also be noted that $[baseline_{12}-c*(TDOA_{12}-TDOT_{12})]$ is substantially small also when moving away from the beacon. This ambiguity can be resolved by TOA measurements, when possible, or other inputs such as dead reckoning records.

Further to determining the direction to the beacon, as basically disclosed so far, the present invention discloses a method to determine the location of the beacon, based on additional measurements. As described in the background section, the intersection of two LOPs (in 2D navigation) determines the position of the beacon, so in addition to the first LOP determined so far, a second LOP may be similarly determined at the detecting device, in order to fix the beacon position, following the steps of:

a. providing information enabling determining the time difference ($TDOT_{34}$) between transmission of a third signal and of a forth signal, of said periodic signals;

b. at a third location, determining the location coordinates, and a receiving time of said third signal;

c. at a forth location, determining the location coordinates, and a receiving time of said forth signal;

d. determining the time difference ($TDOA_{34}$) between said receiving time instant of said third signal and said receiving time instant of said forth signal, and determining the distance ($baseline_{34}$) between said third location and said forth location;

e. determining the location of said radio beacon, from said $TDOT_{12}$, $TDOA_{12}$, $baseline_{12}$, $TDOT_{34}$, $TDOA_{34}$ and $baseline_{34}$.

Obviously, it is possible to configure $TDOT_{12}=TDOT_{34}$.

It should be noted that the baseline for determining the direction to the beacon is preferably in line with the beacon, while the baselines for determining the location of the beacon are preferably perpendicular to the line in the direction of the beacon, providing a favorable geometry for positioning, as will be elaborated in the detailed description section.

Although the basic method disclosed in the present invention tolerates different clocks at the beacon and receiver, preferably, said transmission time instants and receiving time instants are determined with respect to a substantially same time reference, typically synchronized with the GPS time. In this case, for beacon location determination, measurements at two locations (single baseline) are sufficient, since each of these measurements provides a LOP, so the beacon position can be fixed following the steps of:

a. at the beacon, determining the transmission time of the first signal and the second signal with respect to a predefined phase of said same time reference;

b. at the detecting device, determining the location of the radio beacon, from: the coordinates at first and second locations, and the receiving time instant of the first and second signal, and said predefined phase of said same time reference.

For example, the transmission time of all said periodic signals is synchronized with the GPS clock, aligned with the rising edge of a 1 KHz clock phased locked to the GPS 1 PPS clock, the latter been a common output in GPS receivers. Then signals are transmitted only at time intervals of m*(1/1 KHz), i.e. TDOTs have ΔT=1 ms resolution, and permitted TDOTs are: 50 s±1 ms*n, where n=0, 1, 2, . . . , 2500.

At the detecting device, assuming 30 m>$baseline_{12}$, then ΔT=1 ms>(30 Km/c=100 μs)>$baseline_{12}$/c so as discussed earlier, it is feasible to determine $TDOT_{12}$ from $TDOA_{12}$ and ΔT. Then, as the receiving time is also determined according to the GPS clock at the detecting device, the TOA is determined as the receiving time instant minus the time reading of the nearest past 1 KHz rising edge.

It should be noted that the intersection of LOPs determined by TDOA (hyperbolas), as well as the intersection of LOPs determined by TOA (circles), are not unique. Rather, two solutions are possible, symmetrically from both sides of the baseline. This ambiguity is usually resolved, as known in the art, either by additional measurements at further baselines, or by information provided by external sources, such as knowing some initial conditions, or neglecting an improbable solution, such as a mathematical solution indicating the place of a ship on land, etc.

The present invention also discloses a portable device for tracking a radio beacon, said device comprising: a first receiver, a GNSS receiver, a computer and an indicator; said device configured with at least two operating modes: acquisition and tracking; in acquisition mode, said device configured to determine initial geolocation coordinates of said beacon, and in tracking mode said device configured to determine a direction to said beacon while moving substantially on said direction; said device configured to detect signals periodically transmitted by said radio beacon and to accurately measure time of reception of said signals, and provided with information enabling determining at least the time difference ($TDOT_{12}$) between transmission of a first signal and transmission of a second signal, of said periodic signals; and determine, at a first location, the location coordinates, and a receiving time of said first signal; and determine, at a second location, the location coordinates, and a receiving time of said second signal; and determine the time difference ($TDOA_{12}$) between said receiving time of said first and second signal, and determine the distance ($baseline_{12}$) between said first location and said second location; and determine a direction to said radio beacon, based on said $TDOT_{12}$, $TDOA_{12}$ and $baseline_{12}$; and indicate said direction to a user.

A user, in the context of the present invention can be a person or a machine; examples of a person are a pilot or navigator, and an example of a machine is an auto pilot device controlling the movement of an aircraft or vessel configured to reach the beacon.

The information provided to the detecting device enabling determining at least the time difference ($TDOT_{12}$) between transmission of signal 1 and signal 2, is preferably associated with at least one of:
a. data configured in advance at said beacon and at said device;
b. data communicated from said beacon to said device;
c. data specifying $TDOT_{12}$;
d. minimum time difference (ΔT) between permitted values of $TDOT_{12}$;
e. time of transmission with respect to the beacon time reference;
f. time of transmission with respect to a time reference known to the detecting device;
g. time between a predefined phase of said time reference known to the detecting device and time of transmission;
h. maximum operating range;
i. maximum length of $baseline_{12}$.

The disclosed device is further configured to estimate the direction from the second location to the beacon, relatively to the direction from the first location to the second location, as an angle of: arccos $[c*(TDOA_{12}-TDOT_{12})/baseline_{12}]$; wherein c is the speed of light.

The disclosed device is also configured, in tracking mode, at a first location, to determine the direction to a second location such that $[baseline_{12}-c*(TDOA_{12}-TDOT_{12})]$ is substantially small.

The tracking device, in acquisition mode, is further provided with information enabling determining the time difference ($TDOT_{34}$) between transmission of a third signal and a forth signal, of said periodic signals; and configured to determine, at a third location, the location coordinates, and a receiving time instant of said third signal; and to determine at a forth location, the location coordinates, and a receiving time instant of said forth signal; and determine the time difference ($TDOA_{34}$) between said receiving time instant of said third signal and said receiving time instant of said forth signal, and the distance ($baseline_{34}$) between said third location and said forth location; and determine the location of said radio beacon, based on said $TDOT_{12}$, $TDOA_{12}$, $baseline_{12}$, $TDOT_{34}$, $TDOA_{34}$ and $baseline_{34}$.

Preferably, the period of the periodic signals broadcast by the beacon is an integer number multiplied by ΔT, wherein ΔT is greater than at least one of:
a. the maximum operating range divided by the speed of light;
b. the maximum length of $baseline_{12}$ divided by the speed of light.

Preferably, the transmission time determined at the beacon and the receiving time determined at the tracking device are configured with respect to a substantially same time reference, typically the GPS time.

In case that the transmission time and the receiving time are determined with respect to the same time reference, then the beacon is further configured to determine the transmission time of the first signal and second signal with respect to a predefined phase of said same time reference, and the detecting device configured to determine the location of the radio beacon, based on said coordinates at said first and second locations, and on the receiving time instant of said first and second signal, and on said predefined phase of said same time reference.

The present invention further discloses a computer non-transitory readable storage medium storing a program for a mobile device to determine the direction to a radio beacon transmitting periodic signals, the computer program comprising a set of instructions for causing the device to perform the steps of:
a. providing information enabling determining at least the time difference ($TDOT_{12}$) between a transmission time instant of a first signal and a transmission time instant of a second signal, said first and second signals been part of said periodic signals;
b. at a first location, determining the location coordinates, and determining a receiving time instant of said first signal;

c. at a second location, determining the location coordinates, and determining a receiving time instant of said second signal;
d. determining the time difference ($TDOA_{12}$) between the receiving time instant of said first signal and the receiving time instant of said second signal, and determining the distance ($baseline_{12}$) between said first and second locations;
e. determining a direction to said radio beacon, from said $TDOT_{12}$, $TDOA_{12}$ and $baseline_{12}$.

The provided information enabling determining $TDOT_{12}$ is preferable associated with at least one of:
a. data configured in advance at said beacon and at said device;
b. data communicated from said beacon to said device;
c. data specifying $TDOT_{12}$;
d. minimum time difference ($\Delta T$) between permitted values of $TDOT_{12}$;
e. time of transmission with respect to the beacon time reference;
f. time of transmission with respect to a time reference known to said device;
g. time between a predefined phase of said time reference known to said device and time of transmission;
h. maximum operating range;
i. maximum length of $baseline_{12}$.

Further, the computer program comprising a set of instructions for causing the device to perform the steps of:
estimating the direction from said second location to said beacon, relatively to the direction from said first location to said second location, as an angle of:

arccos $[c*(TDOA_{12}-TDOT_{12})/baseline_{12}]$; wherein c is the speed of light.

Furthermore, the computer program comprising a set of instructions for causing the device to perform the steps of:
determining the direction from said first location to a second location such that $[baseline_{12}-c*(TDOA_{12}-TDOT_{12})]$ is substantially small.

The present invention additionally discloses a radio beacon enabling tracking by a moving device, the beacon configured to transmit periodic signals enabling said device to accurately determine a reception time instant of said signals, wherein the time difference between transmissions of at least two of said signals is configured substantially equal to $m*\Delta T$, wherein m is an integer number, and $\Delta T$ is greater than at least one of:
a. the maximum specified range between said beacon and said device, divided by the speed of light;
b. the maximum distance between locations where said two signals are detected, divided by the speed of light.

The latter limitation (b) can be regarded as a limitation on the speed [v] of the tracking device, since the distance between said two locations is equal to: $v*m*\Delta T$, so limitation (b) is equivalent to:
$\max[v*m*\Delta T/c] < \Delta T$, i.e. $\max[v] < c/m$, wherein c=speed of light.

Practically, m is selected considering the maximum possible speed of the moving device. For example, for an airborne moving device with $\max[v]=1000$ Km/h<0.3 Km/s, then $\max[m] \approx 1$ million. And if $m*\Delta T \approx 50$ s, as with the case of Cospas-Sarsat beacons, then according to this example: $\Delta T > 50$ μs.

Preferably, the radio beacon signals are modulated according to a direct sequence spread spectrum (DSSS) scheme, wherein the time difference between transmissions of said two signals is associated with the time difference between same phases of the transmitted direct sequences of said two signals.

Preferably, the disclosed radio beacon further comprises a GNSS receiver, and configured to determine the transmission time of each of said two signals with respect to a predefined phase of a clock synchronized with said GNSS clock, e.g. zero degrees with respect to the rising edge of that clock.

Preferably, the time period of said clock synchronized with said GNSS clock is not shorter than the distance between said beacon and said device, divided by the speed of light, in order to avoid ambiguity in the determination of TDOT of said two signals at the detecting device.

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1 illustrates a GPS Trilateration based on TOA. Three Space Vehicles (satellites) marked SV1, SV2 and SV3 are shown, from each a TOA is measured at a receiver by the earth. In reality each [SV+related TOA] define a sphere, however for simplicity the picture depicts a circle, wherein these circles are shown to intersect at a unique point, at which the receiver is placed. Down in the picture, the three navigation equations that describe this trilateration method are presented (wherein C represents the speed of light):

$$\sqrt{[(x-x_1)^2+(y-y_1)^2+(z-z_1)^2]}=C \times TOA_1$$

$$\sqrt{[(x-x_2)^2+(y-y_2)^2+(z-z_2)^2]}=C \times TOA_2$$

$$\sqrt{[(x-x_3)^2+(y-y_3)^2+(z-z_3)^2]}=C \times TOA_3$$

FIG. 2 illustrates the concept of 2 D Hyperbolic Navigation based on TDOA. Two reference transmitters are depicted by a beacon tower icon, respectively placed at $(x_1, y_1)$ and $(x_2, y_2)$, and a receiver in form of a triangle, at point (x, y). The time difference of arrival of signals from those transmitters to the receiver is marked as $TDOA_{12}$. The distance between the receiver and the transmitters is $\sqrt{[(x-x_1)^2+(y-y_1)^2]}$ and $\sqrt{[(x-x_2)^2+(y-y_2)^2]}$, respectively, so the receiver is placed on a hyperbola, illustrated and defined by the equation presented at the bottom of the picture:

$$\sqrt{[(x-x_1)^2+(y-y_1)^2]}-\sqrt{[(x-x_2)^2+(y-y_2)^2]}=c*TDOA_{12}.$$

FIG. 3 illustrates the concept of 3D Hyperbolic Navigation based on TDOA. Two reference transmitters are depicted, placed at $(x_1, y_1, z_1)$ and $(x_2, y_2, z_3)$ respectively, and a receiver in form of a triangle at point (x, y, z), to measure the time difference of arrival of signals from those transmitters, marked as $TDOA_{12}$. The distance from the receiver to transmitters 1 is $\sqrt{[(x-x_1)^2+(y-y_1)^2+(z-z_1)^2]}$ and to transmitter 2 is $\sqrt{[(x-x_2)^2+(y-y_2)^2+(z-z_2)^2]}$, so the receiver is placed on a hyperboloid, illustrated and defined by the equation: $\sqrt{[(x-x_1)^2+(y-y_1)^2+(z-z_1)^2]}-\sqrt{[(x-x_2)^2+(y-y_2)^2+(z-z_2)^2]}=c*TDOA_{12}$ presented at the bottom of the picture.

FIG. 4 presents a Moving Receiver Measuring TDOA of Signals Transmitted by Radio Beacon. A helicopter is depicted, assumed to have a tracking receiver onboard, and flying on a line passing at points R1, R2, and R3. At these points, it is assumed that TDOA measurements are made, in relation to consecutive signals 1, 2 and 3 transmitted from a beacon depicted by a triangle at point T(x, y), at time intervals: $TDOT_{12}$=time difference of transmission between signals 1 and 2; and $TDOT_{23}$=time difference of transmission between signals 2 and 3. Two hyperbolas are depicted according to these TDOA readings, respectively relating to baseline$_{12}$ and baseline$_{23}$, wherein the beacon at point T(x, y) is depicted on the intersection of these hyperbolas. At the bottom of the picture, the equations that define these hyperbolas are presented (wherein c represents the speed of light):

$$\sqrt{[(x-x_1)^2+(y-y_1)^2]}-\sqrt{[(x-x_2)^2+(y-y_2)^2]}=c*(TDOA_{12}-TDOT_{12});$$

$$\sqrt{[(x-x_2)^2+(y-y_2)^2]}-\sqrt{[(x-x_3)^2+(y-y_3)^2]}=c*(TDOA_{23}-TDOT_{23}).$$

Further are depicted sides and angles in triangle $TR_2R_3$: $TR_2$=c; $R_2R_3$=d=d1+d2; $TR_3$=e; $\phi_2$=angle($TR_2R_3$); 180−$\phi_3$=angle($TR_3R_2$).

FIG. 5 presents Low GDOP Hyperbolic Navigation with Moving Receiver. A helicopter is depicted, assumed to have a tracking receiver onboard, and flying on a line marked as X-axis, passing at points $R_1$ and $R_2$, then flying on another line marked as X'-axis, passing at points $R_3$ and $R_4$. A beacon to be tracked is depicted by a triangle at point T(x, y), assumedly transmitting signals 1 and 2 at a time difference of $TDOT_{12}$, and also transmitting signals 3 and 4 at a time difference of $TDOT_{34}$. It is also assumed that TDOA measurements are made at points $R_1$, $R_2$, $R_3$ and $R_4$, related to baseline $R_1R_2$ formed by points $R_1$ and $R_2$, and to baseline $R_3R_4$ formed by points $R_3$ and $R_4$. The Y-axis and Y'-axis are respectively perpendicular to the X-axis and X'-axis, wherein the origin of the XY frame is on baseline $R_1R_2$ and the origin of the X'Y' frame is on baseline $R_3R_4$. Two hyperbolas (each having two branches symmetrically mirrored over the Y and Y' axis) are depicted, respectively related to the $TDOA_{12}$ and $TDOA_{34}$ measurements, and as expected, T(x, y) is shown at the intersection of said two hyperbolas. At the bottom of the picture, the equations that define these hyperbolas are presented (wherein c represents the speed of light):

$$x^2/0.5*c*(TDOA_{12}-TDOT_{12})^2-y^2/[(0.5*R_1R_2)^2-(0.5*c*(TDOA_{12}-TDOT_{12})^2]=1$$

$$x^2/0.5*c*(TDOA_{34}-TDOT_{34})^2-y^2/[(0.5*R_3R_4)^2-(0.5*c*(TDOA_{34}-TDOT_{34})^2]=1$$

FIG. 6 shows Determining Direction to a Radio Beacon from a Moving Receiver. A helicopter is depicted, assumed to have a tracking receiver onboard, and flying on a line passing at points $R_1$ and $R_2$, at point $R_2$ changing course by an angle of $\phi_2$, then moving on a line passing at point $R_3$, in the direction of a beacon placed at point T(x, y). The beacon, depicted by a triangle, assumedly transmitting signal 1 and signal 2 at a transmission time difference of $TDOT_{12}$, said signals detected at points $R_1$ and $R_2$ respectively at a time difference of $TDOA_{12}$. At the bottom of the picture, an equation estimating the angle $\phi_2$ by which the helicopter should turn at point $R_2$ in order to fly towards the beacon at T(x, y) is presented (C is the speed of light; $R_1R_2$ is the distance between $R_1$ and $R_2$):

$$\cos(\phi_2)\approx(a-c)/b=C*(TDOA_{12}-TDOT_{12})/R_1R_2$$

Also, in triangle $TR_1R_2$, side $TR_1$ is marked a, side $R_1R_2$ is marked b, and side $TR_2$ is marked c.

FIG. 7 shows Receiver Directed to Radio Beacon based on TDOA Measurements. A helicopter is depicted, assumed to have a tracking receiver onboard, and flying on a line passing at points $R_1$ and $R_2$, substantially at the direction of a beacon depicted by a triangle at point T(x, y). The beacon is assumed to transmit signal 1 and signal 2 at a transmission time difference of $TDOT_{12}$, those signals detected at points $R_1$ and $R_2$ respectively at a time difference of $TDOA_{12}$. At the bottom of the picture, shown is an equation estimating the criterion indicating that the helicopter is substantially in a direction towards the beacon (wherein c represents the speed of light and $R_1R_2$ is the distance between $R_1$ and $R_2$):

$$[R_1R_2-c*(TDOA_{12}-TDOT_{12})]\approx 0$$

FIG. 8 presents a Block Diagram of Device for Beacon Tracking According to a Preferred Embodiment. The picture shows a computer coupled to: a first receiver, a GPS receiver and an indicator, and further having an I/O interface to the external world. A PLL (Phase Locked Loop) block is also shown, fed from a TCXO (Temperature Compensated Crystal Oscillator), and controlled by a time signal provided by the GPS receiver. The PLL output is shown to be routed to the computer and to the first receiver. Each of the first receiver and GPS receiver is depicted with an antenna on top. The schematic I/O block represents any kind of wired or wireless interface, such as standard USB, Bluetooth or customized I/O.

FIG. 9 illustrates a Flow Chart of Beacon Tracking Process, depicting the following events/steps at the receiver (unless indicated otherwise):

Define min ($\Delta\phi$);

Acquire initial radio beacon coordinates; determine initial distance; determine initial direction;

Move in the initial direction to the Radio Beacon, and indicate $\phi_0$;

Set i=1;

Input from the beacon: Radio Beacon Transmission i;

In reaction, at the receiver: Define point $R_i$ and Measure receiving time & self position.

[Loop]—Input from the beacon: Radio Beacon Transmission i+1;

In reaction, at the receiver: Define point $R_{i+1}$ and Measure receiving time & self position.

Determine $\cos \phi_{(i+1)}=C*(TDOA_{i(i+1)}-TDOT_{i(i+1)})]/R_iR_{(i+1)}$; Indicate $\phi_{(i+1)}$ Check: Is $|\phi_{(i+1)}|<\min(\Delta\phi)$?

If the answer is Yes, then indicate: Keep Current Course;

If the answer is No, then indicate: Change Course by $\phi_{(i+1)}$;

End if initial distance made good; otherwise update: i=i+1 and go to [Loop].

FIG. 10 shows Transmission and Receiving Timing of periodic signals transmitted by the beacon and detected by the receiving device. The diagram at the upper part of the picture shows the transmitted signals vs. the transmitter time (clock). Shown are a first signal and a second signal, and the time ($TDOT_{12}$) between the transmission thereof, as measured by the transmitter clock. A later third signal is also shown.

The diagram at the bottom part of the picture shows the transmitted signals as detected at the moving receiving device, and time tagged according to the receiving clock. A helicopter is depicted under the time axis, indicating that the receiving device is moving from left to right. The first signal is shown to be detected at a first location, and the second signal is shown to be detected at a second location, as well as the time ($TDOA_{12}$) between detection thereof, as measured at the receiver. Also shown is the third signal as detected at a third location. For the $2^{nd}$ signal, the difference between transmission time according to the transmission clock and receiving time according to the receiving clock is indicated as (pseudo-range)/c, wherein c means speed of light.

FIG. 11 shows Transmission and Detection Synchronized with GPS Clock. The diagram at the upper part of the picture shows the transmitted signal vs. the transmitter time (clock) and the diagram at the bottom part of the picture shows the transmitted signal as detected at the moving receiving device, according to the receiving clock. On both diagrams, 1 PPS and 1000 PPS pulses synchronized with the GPS clock are depicted, obviously aligned in time. The Transmitted signal is shown exactly aligned with a 1000 PPS pulse, and at the lower diagram, the time between the receiving time of the signal and the nearest past 1000 PPS pulse is indicated as range/c, wherein c means the speed of light.

FIG. 12 illustrates the Beacon Block Diagram According to a first embodiment of the present invention. From left side, a master clock block is depicted, based on a TCXO (Temperature Compensated Crystal Oscillator) generating a basic frequency of 12.68875 MHz. This master clock is employed, via multiplication (PLL) and/or division, to generate other clock waves at the beacon, synchronized with each other: the carrier frequency at 406.04 MHz (upper branch), the PRN code at 80.31 KHz (center branch), and the Data (beacon message) clock at 400 Hz (lower branch). In particular it is important according to the present invention to control the Time Difference between Transmissions [TDOT], which is illustrated by the SYNC block coupled to the PRN Code Generator. The beacon message is provided by the Data block, coupled to the Data Processing Message block which clocks out the message bits. The serial bits output from the Data processing Message block and the serial chips output from the PRN Code Generator are coupled to inputs of a circular depicted block with an internal plus sign illustrating an exclusive-or (XOR) function employed on the data and PRN code. Finally, a PSK Modulator block illustrates the modulation of said XOR product on the UHF carrier, resulting with a signal to be transmitted, via the antenna shown at the upper-right side of the picture.

FIG. 13 illustrates the Beacon Block Diagram According to a second embodiment of the present invention. This figure comprises all the building blocks depicted in FIG. 12 (the first embodiment), and in addition: a GPS receiver+antenna is depicted by the upper-left corner, from which a 1 Hz, i.e. 1 PPS signal is output, coupled to a PLL block generating a 1 KHz (1000 PPS) clock. That 1 KHz clock is routed to the SYNC block that controls the phase of the PRN sequence, consequently controlling the time of transmission and TDOT.

DETAILED DESCRIPTION

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The present invention discloses a method for tracking a radio beacon from a moving device, comprising the steps of:
a. at said radio beacon transmitting periodic signals;
b. providing said device with information enabling determining at least the time difference ($TDOT_{12}$) between transmission time of a first signal and transmission time of a second signal, said first and second signals been part of said periodic signals;
c. at said device, at a first location, determining the location coordinates, and a receiving time of said first signal;
d. at said device, at a second location, determining the location coordinates, and a receiving time of said second signal;
e. at said device, determining the time difference ($TDOA_{12}$) between the receiving time of said first signal and the receiving time of said second signal, and the distance ($baseline_{12}$) between said first and second locations;
f. at said device, determining a direction to said radio beacon, from said $TDOT_{12}$, $TDOA_{12}$ and $baseline_{12}$.

FIG. 10 shows two time diagrams illustrating the periodic signals transmitted by the beacon and detected by the receiving device, according to a first embodiment of the present invention. The upper diagram shows three signals transmitted by the beacon, part of more signals that are not shown, related to a time scale defined by the beacon clock. The lower diagram shows the transmitted signals as detected at the moving receiving device, related to a time scale defined by the receiving clock. A helicopter depicted under the receiving time axis illustrates that the receiving device (assuming carried onboard) is moving, and indicating that each signal is detected at a different location. Preferably, the beacon is assumed to be substantially stationary during the transmission of these signals. FIG. 10 also indicates the time ($TDOT_{12}$) between the transmission of a first signal and a second signal, as measured by the transmitter clock, and the time ($TDOA_{12}$) between detection of these first and second signals as measured at the receiver. At the lower diagram, the difference between transmission time according to the transmission clock and the receiving time according to the receiving clock is indicated as (pseudo-range/c), wherein c means speed of light.

FIG. 4 illustrates the scenario of FIG. 10, but from a spatial (2D) view. The beacon is depicted as a triangle at point T(x, y) and the Moving Receiver is shown as a helicopter flying from right to left on a line passing at points $R_1$, $R_2$, and $R_3$. At points $R_1$ and $R_2$, two transmitted signals are detected (the first signal or signal 1 detected at $R_1$, and the second signal or signal 2 detected at $R_2$) and the difference in time of arrival ($TDOA_{12}$) of these signals is determined, as well as determination of the distance ($baseline_{12}$) between $R_1$ and $R_2$. Then, at point $R_3$ signal 3 (or the third signal) is detected, and the difference in time of arrival ($TDOA_{23}$) between signal 2 and signal 3 is determined, as well as the distance ($baseline_{23}$) between $R_2$ and $R_3$.

Then, assuming that $TDOT_{12}$ and $TDOT_{23}$ can be determined at the receiver, the location of the beacon can be determined at the intersection of two hyperbolas, according to the two equations depicted at the bottom of FIG. 4. Another method to determine the beacon location T(x, y) based on triangle $TR_2R_3$ will be disclosed later.

The present invention also discloses a portable device for tracking a radio beacon, said device comprising: a first receiver, a GNSS receiver, a computer and an indicator; said device configured with at least two operating modes: acquisition and tracking; in acquisition mode, said device configured to determine initial geolocation coordinates of said beacon, and in tracking mode said device configured to determine a direction to said beacon while moving substantially on said direction; said device configured to detect signals periodically transmitted by said radio beacon and to accurately measure time of reception of said signals, and provided with information enabling determining at least the time difference ($TDOT_{12}$) between transmission of a first signal and of a second signal, of said periodic signals; and determine, at a first location, the location coordinates, and a receiving time of said first signal; and determine, at a second location, the location coordinates, and a receiving time of said second signal; and determine the time difference ($TDOA_{12}$) between said receiving time of said first and second signal, and determine the distance ($baseline_{12}$) between said first location and said second location; and determine a direction to said radio beacon, based on said $TDOT_{12}$, $TDOA_{12}$ and $baseline_{12}$; and indicate said direction to a user.

FIG. 8 presents a Block Diagram of a receiving Device for Beacon Tracking according to a preferred embodiment of the invention. The picture shows a computer coupled to: a first receiver, a GPS receiver and an indicator, and in addition an I/O interface to the external world. This first receiver is capable of detecting DSSS signals and capable of accurately determining the receiving time instant of this signals. The receiving device also comprises, as shown in FIG. 8, a PLL (Phase Locked Loop), fed by a TCXO (Temperature Compensated Crystal Oscillator), e.g. at 20 MHz, and controlled by a timing signal provided by the GPS receiver. This timing signal is preferably the 1 PPS clock commonly provided by GPS receivers; the output of the PLL is preferably a 1 KHz clock phased locked to the GPS 1 PPS, and this PLL output is routed to the first receiver and to the computer, the latter also configured to read the GPS TOD via the bus coupling between those blocks.

The indicator is preferably a display, capable of showing, among other functions and data, the direction to the beacon in degrees or graphically on a background of a compass dial, with respect to the magnetic or geographical north. Nevertheless, though preferably the indicator is configured to serve a human user, it is also possible that the computer output will interface a machine, in addition or instead of interfacing a human user.

According to a first embodiment of the invention, the radio beacon is configured to broadcast signals every 50±2.5 seconds, so 47.5 s<$TDOT_{12}$<52.5 s; however the actual time of transmission, and the time [TDOT] between successive transmissions is not required to be determined in advance, and can even be pseudo-randomly distributed. Preferably, the basic clock used at the beacon to determine the transmission time, and therefore the TDOT, obtains a resolution not worse than 0.1 µs (10 MHz), for example 20 MHz, the latter equivalent to 15 m in pseudo-range.

Preferably, the transmitted signal is modulated according to a predefine DSSS scheme, enabling to accurately determine the receiving time instant. The chip rate of the spreading sequence in this DSSS scheme is preferably 100 Kc/s, which may provide a receiving time determination resolution of approximately 1%*1/100 Kc/s=0.1 µs, i.e. 30 m in pseudo-range.

According to the first embodiment of the invention, the beacon clock is independent, yet according to the second embodiment of the invention, the beacon clock is synchronized to the GPS clock, as will be elaborated later.

Providing the detecting device with information enabling determining $TDOT_{12}$ may be done in several ways, as already discussed, wherein the information is associated with:
  a. data configured in advance at said beacon and at said device;
  b. data communicated from said beacon to said device;
  c. data specifying $TDOT_{12}$;
  d. minimum time difference ($\Delta T$) between permitted values of $TDOT_{12}$;
  e. time of transmission with respect to the beacon time reference;
  f. time of transmission with respect to a time reference known to said device;
  g. time between a predefined phase of said time reference known to said device and time of transmission;
  h. maximum operating range;
  i. maximum length of $baseline_{12}$.

According to the first embodiment of the present invention, $TDOT_{12}$ is not specifically determined in advanced; neither it is explicitly communicated to the detecting device. Rather, it is agreed in advanced that a minimum difference ($\Delta T$) between permitted values of $TDOT_{12}$ will be employed, i.e. the time between any two consecutive signal transmissions is configured in $\Delta T=1$ ms steps (practically, a tolerance of ±0.1 µs is expected, due to the clock resolution and other factors). Specifically, permitted TDOTs are set to: 50 s±1 ms*n, where n=0, 1, 2, . . . , 2500. So TDOT is an integer number of $\Delta T$'s, wherein $\Delta T$ is greater than at least one of:
  a. the maximum operating range divided by the speed of light;
  b. the maximum length of $baseline_{12}$ divided by the speed of light.

So according to the first embodiment of the invention, either: [max operating range]<1 ms*c=300 Km; or $baseline_{12}$<300 Km. Practically, even $baseline_{12}$<30 Km can be easily assumed accounting for maximum TDOT of 52.5 s and speed limit of detecting device of 2,000 Km/h, since at this speed and during this time interval the detecting device makes (2000/3600)Km/s*52.5 s=29.2 Km. Quantizing TDOT this way, $\Delta T=1$ ms enables determining $TDOT_{12}$ at the receiving device, just by identifying the permitted TDOT nearest to the measured $TDOA_{12}$. Then, by subtracting [$TDOA_{12}$−$TDOT_{12}$], the detecting device normalizes the TDOA measured by a single receiver at two locations referring to two different signals, to a TDOA that theoretically would have been measured simultaneously by two receivers at said two locations referring to a single signal.

Now some mathematical aspects of the invention will be elaborated, considering FIG. 6.

FIG. 6 illustrates Determining Direction to a Radio Beacon from a Moving Receiver. A helicopter is depicted, assumedly with a tracking receiver onboard, flying on a line passing at a first location $R_1$ and a second location $R_2$, then at $R_2$ changing its flight course by an angle of $\phi_2$, and further moving on a line passing at point $R_3$, in the direction of a beacon placed at point T(x, y). The beacon, depicted by a triangle, assumedly transmitting a first signal detected at $R_1$ and a second signal detected at $R_2$, from which the detecting device determines $TDOA_{12}$, and also $TDOT_{12}$, assuming TDOT=$\Delta T$*n, wherein n is integer and $\Delta T=1$ ms. The detecting device is configured with a GPS receiver and determines the coordinates at $R_1$ and $R_2$, then able to determine the distance between $R_1$ and $R_2$, defined as $baseline_{12}$. At the bottom of the picture, an equation estimating the angle $\phi_2$ by which the helicopter should turn at point $R_2$ in order to fly towards the beacon at T(x, y) is presented ($R_1R_2$ is the distance between $R_1$ and $R_2$, sometimes marked as $baseline_{12}$ in this document): $\cos(\phi_2) \approx (a-c)/b = C*(TDOA_{12}-TDOT_{12})/R_1R_2$; C representing the speed of light. Still, as skilled persons understand, the angle of $\phi_2$ also complies with that equation, since $\cos(\phi_2)=\cos(-\phi_2)$, so there is an ambiguity in the solution of the direction based on TDOA measurements. That alternative solution for the position of the beacon based on $-\phi_2$, which may be marked as T'(x, −y), is mirrored over to the X-axis with respect to T(x, y), and not shown in the picture. However, as skilled persons appreciate, this ambiguity can be removed in several ways, e.g. with TOA measurements, further TDOA measurements (on different baselines), dead reckoning or other inputs.

Triangle $TR_1R_2$ will be now observed, using the designation: $TR_1$=a; $R_1R_2$=b=baseline$_{12}$; $TR_2$=c; and also replacing: $(TR_1-TR_2)$=(a−c)=C*[TDOA$_{12}$−TDOT$_{12}$]; wherein C=speed of light. It should be noted that in this part of the document, the speed of light is marked by a capital C, to distinguish it from the triangle side c=$TR_2$.

First, the equation (a−c)=C*[TDOA$_{12}$−TDOT$_{12}$] will be proved.

Assuming a time difference of τ (positive or negative or zero) between the transmitter clock and the receiver clock, then:

$a$=range between $T$ and $R_1$=$C*[rx_1-(tx_1+\tau)]$;

$c$=range between $T$ and $R_2$=$C*[rx_2-(tx_2+\tau)]$;

wherein:

$rx_1$ is the receiving time of signal 1 according to the receiver clock and $tx_1$ is the transmission time of signal 1 according to the transmitter clock;

$rx_2$ is the receiving time of signal 2 according to the receiver clock and $tx_2$ is the transmission time of signal 2 according to the transmitter clock;

then: $(a-c)=C*[(rx_1-rx_2)-(tx_1-tx_2)]=C*[TDOA_{12}-TDOT_{12}]$.

Next, according to the law of cosines in triangle $TR_1R_2$:

$a^2=c^2+b^2-2*c*b*\cos(180°-\phi_2)$; then:

$a^2=c^2+b^2+2*c*b*\cos(\phi_2)$;

$\cos(\phi_2)=(a^2-c^2-b^2)/2bc=[(a-c-b)*(a+c+b)+2bc]/2bc=[(a-c)-b]*(a+c+b)/2bc+1$; so:

$\cos(\phi_2)=1-[b-(a-c)]*(a+c+b)/2bc$. (3)

According to the triangle inequality, (a+c+b)>2*max(a, b, c), and [b−(a−c)]>0, so:

$[b-(a-c)]*(a+c+b)/2bc>[b-(a-c)]*2c/2bc=1-(a-c)/b$;

$(a-c)/b>1-[b-(a-c)]*(a+c+b)/2bc$; so:

$\cos(\phi_2)<(a-c)/b$, or:

$\cos(\phi_2)<C*(TDOA_{12}-TDOT_{12})/baseline_{12}$; (4)

and if $\phi_2$<180°, then:

$\phi_2>\arccos\{[C*(TDOA_{12}-TDOT_{12})]/baseline_{12}\}$.

Looking again at the general equation (3), some special cases will be now analyzed.

If the detecting device is far away from the beacon, compared to the length of baseline$_{12}$, i.e. b<<a, then due to the triangle inequality also b<<c, and a≈c, so in this case:

$\cos(\phi_2)=1-[b-(a-c)]*(a+c+b)/2bc≈1-[b-(a-c)]*2c/2bc=1-[b-(a-c)]/b=(a-c)/b$, so:

if b<<a, then: $\cos(\phi_2)≈C*(TDOA_{12}-TDOT_{12})/baseline_{12}=(a-c)/b$; so: (5)

$\phi_2≈\arccos[C*(TDOA_{12}-TDOT_{12})/baseline_{12}]$

In order to examine the scope of the estimation expressed in equation (5), the difference [Δ cos(Δ cos($\phi_2$)] between the accurate $\cos(\phi_2)$ according to equation (3) and the estimated $\cos(\phi_2)$ according to equation (5) will be studied:

$\Delta \cos(\phi_2)=(a^2-c^2-b^2)/2bc-(a-c)/b=(a^2-c^2-b^2-2ca+2c^2)/2bc=[(a^2+c^2-2ca)-b^2]/2bc$, or:

$\Delta \cos(\phi_2)=[(a-c)^2-b^2]/2bc$. (6)

Still according to the triangle inequality: −b<(a−c)<b, so |a−c|<b, and [(a−c)²−b²]<0. Hence Δ cos($\phi_2$) is negative (or zero in the degenerated case of a triangle which is a line, when $\phi_2$ is 0° or 180°), i.e. the real=accurate cos($\phi_2$) is smaller than (or equal to) the estimated cos($\phi_2$), and (for $\phi_2$<180°) the real=accurate ($\phi_2$) is larger than (or equal to) the estimated ($\phi_2$), as taught by equation (4).

Since Δ cos($\phi_2$) is not positive, then the maximal error of the estimated equation (5) is reached when |Δ cos($\phi_2$)|=Δ cos($\phi_2$)=[b²−(a−c)²]/2bc is at maximum, i.e. when a=c, then the error is b/2c, and finally: −b/2c≤Δ cos($\phi_2$)≤0.

Some practical examples of the estimation of $\phi_2$ according to equation (5) will be reviewed below.

if c=10b then: (7)

$\Delta \cos(\phi_2)=[(a-c)^2-b^2]/2bc=[(a-10b)^2-b^2]/20b^2=(a/b)^2/20-(a/b)+99/20$.

Due to the triangle inequality, (c+b)=11b>a>(c−b)=9b, i.e. 11>(a/b)>9.

Some computed figures of Δ cos($\phi_2$) in this range are:

if a/b=9.0, then: Δ cos($\phi_2$)=0;

if a/b=9.2, then: Δ cos($\phi_2$)=−0.018;

if a/b=9.4, then: Δ cos($\phi_2$)=−0.032;

if a/b=9.6, then: Δ cos($\phi_2$)=−0.042;

if a/b=9.8, then: Δ cos($\phi_2$)=−0.048;

if a/b=10.0, then: Δ cos($\phi_2$)=−0.05;

if a/b=10.2, then: Δ cos($\phi_2$)=−0.048;

if a/b=10.4, then: Δ cos($\phi_2$)=−0.042;

if a/b=10.6, then: Δ cos($\phi_2$)=−0.032;

if a/b=10.8, then: Δ cos($\phi_2$)=−0.018;

if a/b=11.0, then: Δ cos($\phi_2$)=0.

The above figures show that for c=10b the maximum estimation error |Δ cos($\phi_2$)| is at a=c, i.e. when the triangle $TR_1R_2$ is isosceles, which occurs when the estimated $\phi_2$ is ±90°; the minimum estimation error is zero, when a=11b or a=9b, i.e. when b=|a−c|, i.e. when the course to the beacon is 0° or 180°. As skilled persons appreciate, a small deviation in cos($\phi_2$) means also a small deviation in $\phi_2$.

Further for example, if c=10b and a=10.8b, then:

According to the general equation (3): cos($\phi_2$)=1−0.2*21.8/20=0.782, so $\phi_2$=38.6°;

According to the estimation equation (5): cos($\phi_2$)=(a−c)/b=0.8, so $\phi_2$=36.9°;

and the difference Δ($\phi_2$) between (3) and (5) is: 38.6°−36.9°=1.7°.

Checking with equation (6): Δ cos($\phi_2$)=[(a−c)²−b²]/2bc=[(0.8)²−1]/20=−0.018=0.782−0.8.

if c=10b the maximum estimation error is at a=10b, then: (8)

According to the general equation (3): $\cos(\phi_2)=1-21/20=-0.05$, so $\phi_2=92.9°$;

According to the estimation equation (5): $\cos(\phi_2)=(a-c)/b=0$, so $\phi_2=90°$;

and the difference $\Delta(\phi_2)$ between (3) and (5) is: $92.9°-90°=2.9°$.

$$\text{if } c=5b \text{ then according to (3): } \cos(\phi_2)=(a^2-26b^2)/10b^2 = a^2/10b^2 - 2.6. \quad (9)$$

For example, if $c=5b$ and $a=5.8b$, then:

According to equation (9): $\cos(\phi_2)=5.8^2/10-2.6=0.764$, so $\phi_2=40.2°$;

[Checking] According to equation (3): $\cos(\phi_2)=(5.8^2-5^2-1^2)/10=0.764$, so $\phi_2=40.2°$;

According to equation (5): $\cos(\phi_2)=(a-c)/b=0.8$, so $\phi_2=36.9°$;

and the difference $\Delta(\phi_2)$ between the real angle (3) and the estimated angle (5) is: $40.2°-36.9°=3.3°$.

$$\text{if } c=5b \text{ the maximum estimation error is at } a=5b, \text{ then:} \quad (10)$$

According to the general equation (3): $\cos(\phi_2)=1-11/10=-0.1$, so $\phi_2=95.7°$;

According to the estimation equation (5): $\cos(\phi_2)=(a-c)/b=0$, so $\phi_2=90°$;

and the difference $\Delta(\phi_2)$ between (3) and (5) is: $95.7°-90°=5.7°$.

$$\text{If } [b-(a-c)]=[\text{baseline}_{12}-C^*(\text{TDOA}_{12}-\text{TDOT}_{12})]=0,$$
$$\text{then: } \cos(\phi_2)=1 \text{ and } \phi_2=0° (\text{or } 180°), \quad (11)$$

indicating that the device is exactly on course towards (or away from) the beacon. Distinguishing between moving towards or away from the beacon can be done, as skilled persons understand, by TOA measurements, or additional TDOA measurements, or dead reckoning or other inputs.

Furthermore, as seen from equation (3), the closer to zero is [$\text{baseline}_{12}-C^*(\text{TDOA}_{12}-\text{TDOT}_{12})$], closer to 1 is $\cos(\phi_2)$, and the smaller is angle $\phi_2$, indicating a closer course towards the beacon.

Some cases of small $\phi_2$ at short range between beacon and detecting device will be now considered.

$$\text{if } c=b, a=1.9b, \text{then:} \quad (12)$$

According to the general equation (3): $\cos(\phi_2)=1-0.1*3.9/2=0.805$, so $\phi_2=36.4°$;

According to the estimation equation (5): $\cos(\phi_2)=(a-c)/b=0.9$, so $\phi_2=25.8°$;

and the difference $\Delta(\phi_2)$ between (3) and (5) is: $36.4°-25.8°=10.6°$.

$$\text{if } c=b, a=1.95b, \text{then:} \quad (13)$$

According to the general equation (3): $\cos(\phi_2)=1-0.05*3.95/2=0.901$, so $\phi_2=25.7°$;

According to the estimation equation (5): $\cos(\phi_2)=(a-c)/b=0.95$, so $\phi_2=18.2°$;

and the difference $\Delta(\phi_2)$ between (3) and (5) is: $25.7°-18.2°=7.5°$.

$$\text{if } c=b, a=1.98b, \text{then:} \quad (14)$$

According to the general equation (3): $\cos(\phi_2)=1-0.02*3.98/2=0.960$, so $\phi_2=16.2°$;

According to the estimation equation (5): $\cos(\phi_2)=(a-c)/b=0.98$, so $\phi_2=11.5°$;

and the difference $\Delta(\phi_2)$ between (3) and (5) is: $16.2°-11.5°=4.7°$.

$$\text{if } c=b, a=1.995b, \text{then:} \quad (15)$$

According to the general equation (3): $\cos(\phi_2)=1-0.005*3.995/2=0.990$, so $\phi_2=8.1°$;

According to the estimation equation (5): $\cos(\phi_2)=(a-c)/b=0.995$, so $\phi_2=5.7°$;

and the difference $\Delta(\phi_2)$ between (3) and (5) is: $8.1°-5.7°=2.4°$.

Finally the case of large $\phi_2$ at short range between beacon and detecting device is considered.

$$\text{if } c=b=a, \text{then:} \quad (16)$$

According to the general equation (3): $\cos(\phi_2)=1-3/2=-0.5$, so $\phi_2=120°$;

According to the estimation equation (5): $\cos(\phi_2)=(a-c)/b=0$, so $\phi_2=90°$;

and the difference $\Delta(\phi_2)$ between (3) and (5) is: $120°-90°=30°$.

Hence at these conditions the estimation equation (5) is not accurate.

As a conclusion, it can be seen that equation (5) estimates the angle $\phi_2$ in better than 3° when the beacon is about 10 times $\text{baseline}_{12}$ away from the detecting device (cases 7, 8 above); and in better than 6° when the beacon is about 5 times $\text{baseline}_{12}$ away from the detecting device (cases 9, 10 above); when the distance between the beacon and the detecting device is short, such that the distance to the beacon is about 1 $\text{baseline}_{12}$ from the detecting device, equation (5) provides an estimation for the angle $\phi_2$ to the beacon accurate to about 5° when the real course is about 15° (case 14 above).

So preferably, the detecting device is configured to employ equation (5), i.e. estimate the direction from said second location to said beacon, relatively to the direction from said first location to said second location, as the angle $\phi_2=\arccos[c^*(\text{TDOA}_{12}-\text{TDOT}_{12})/\text{baseline}_{12}]$, when the beacon is about 5 times $\text{baseline}_{12}$ away or more, at any direction, or when the beacon is closer and already moving in the direction of the beacon, about plus or minus 15 degrees.

In tracking mode, for a given first location, the detecting device is configured to determine the direction to a second location such that $[\text{baseline}_{12}-c^*(\text{TDOA}_{12}-\text{TDOT}_{12})]$ is substantially small. In terms of triangle $TR_1R_2$, this condition means that $[b-(a-c)]$ is substantially small, where ultimately the smallest is the case of $[b-(a-c)]=0$ (a negative value is not permitted due to the triangle inequality).

From the above cases (12)-(15) it can be seen that as $[\text{baseline}_{12}-c^*(\text{TDOA}_{12}-\text{TDOT}_{12})]=[b-(a-c)]$ gets smaller, so is $\phi_2$ smaller, i.e. the detecting device course is closer to the direction of the beacon, and equation (5) better estimates that direction:

According to (12): at $[b-(a-c)]=0.1b$, $\phi_2=36.4°$ and $\Delta(\phi_2)=10.6°$;

According to (13): at $[b-(a-c)]=0.05b$, $\phi_2=25.7°$ and $\Delta(\phi_2)=7.5°$;

According to (14): at $[b-(a-c)]=0.02b$, $\phi_2=16.2°$ and $\Delta(\phi_2)=4.7°$;

According to (15): at $[b-(a-c)]=0.005b$, $\phi_2=8.1°$ and $\Delta(\phi_2)=2.4°$.

So the preferred operational tracking strategy would be, upon acquiring the initial beacon coordinates, to move directly towards the beacon, and confirm that direction while still been away from the beacon.

This tracking scenario is illustrated in FIG. 7, showing a Receiver Directed to a Radio Beacon based on TDOA Measurements, according to the first embodiment of the invention. The good old helicopter is depicted, assumed to have a tracking receiver onboard, and flying on a line passing at a first location $R_1$ and a second location $R_2$, substantially at the direction of a beacon depicted by a triangle at point T(x, y). The beacon is assumed to transmit a first signal and a second signal at a transmission time difference of $TDOT_{12}$, and those signals are respectively detected at points $R_1$ and $R_2$, at a time difference of $TDOA_{12}$. The disclosed criterion for indicating been on a substantially direct course to the beacon is $[R_1R_2-c*(TDOA_{12}-TDOT_{12})]\approx 0$, wherein c represents the speed of light and $R_1R_2$ is the distance between $R_1$ and $R_2$, i.e. baseline$_{12}$.

Before entering the tracking mode, where the device is configured to determine the direction to the beacon, as discussed above, it preferably enters an acquisition mode, where the device determines the beacon location. This acquisition phase can be merely a process of getting the location coordinates of the beacon from an external source, such as the Cospas-Sarsat system, through the I/O interface shown in FIG. 8, or independently acquiring the beacon location by TDOA measurements.

According to the first embodiment of the invention, the detecting device determines initial coordinates of the beacon by measurements providing two LOPs (referring to 2D navigation), preferably at Geometry obtaining good (low) Dilution of Precision (DOP or GDOP). This process is illustrated in FIG. 5, titled: Low GDOP Hyperbolic Navigation with Moving Receiver. Our helicopter, assumed to have a tracking receiver onboard, is depicted making two sets of TDOA measurements, each set on a different baseline, to provide two independent LOPs. According to a rough estimation of the beacon location, two lines are selected, the depicted x-axis and x'-axis, on which baseline$_{12}$ and baseline$_{34}$ are formed, according to the locations where a first ($R_1$) and a second ($R_2$) signal, then a third ($R_3$) and a forth ($R_4$) signal, are detected. The beacon to be tracked is depicted by a triangle at point T(x, y), assumedly transmitting signals 1 and 2 at a time difference of $TDOT_{12}$, and also transmitting signals 3 and 4 at a time difference of $TDOT_{34}$. Preferably, in order to have low GDOP, said X-axis and X'-axis are substantially perpendicular with each other, and determined so that a line connecting the estimated position of the beacon with a point approximately in the middle of each baseline, is perpendicular to that baseline. On each baseline TDOA is measured, TDOT is determined, and the baseline length is also determined. As already discussed, each set of said measurements provides a hyperbolic LOP, and at the crossing of these LOPs the beacon position is determined.

The equations that define these hyperbolas are:

$$x^2/0.5*c*(TDOA_{12}-TDOT_{12})^2-y^2/[(0.5*R_1R_2)^2-(0.5*c*(TDOA_{12}-TDOT_{12})^2]=1; \qquad (17)$$

$$x^2/0.5*c*(TDOA_{34}-TDOT_{34})^2-y^2/[(0.5*R_3R_4)^2-(0.5*c*(TDOA_{34}-TDOT_{34})^2]=1; \qquad (18)$$

wherein $R_1R_2$ is baseline$_{12}$ and $R_3R_4$ is baseline$_{34}$.

As a skilled person understands, the use of different X-Y frames for the different baselines in FIG. 5 was made for explanation purposes, however in fact, a common X-Y (or X-Y-Z) frame should be used at both sets of measurements in order to have a common basis to solve the two quadratic equations.

In details, the steps to follow in order to determine a second LOP, in addition to the first LOP, then fix the beacon position, are:

a. providing information enabling determining the time difference ($TDOT_{34}$) between transmission of a third signal and of a forth signal, part of the periodic signals transmitted by the beacon;
b. at a third location, determining the location coordinates, and a receiving time of said third signal;
c. at a forth location, determining the location coordinates, and a receiving time of said forth signal;
d. determining the time difference ($TDOA_{34}$) between said receiving time instant of said third signal and said receiving time instant of said forth signal, and determining the distance (baseline$_{34}$) between said third location and said forth location;
e. determining the location of said radio beacon, from $TDOT_{12}$, $TDOA_{12}$, baseline$_{12}$, $TDOT_{34}$, $TDOA_{34}$ and baseline$_{34}$.

It is possible, according to the present invention to configure $TDOT_{12}=TDOT_{34}$.

Another method to determine the location of the beacon will be now disclosed, related to FIG. 4.

Looking back at FIG. 4, a skilled person can see that triangle $TR_2R_3$ can be solved, from one side: $R_2R_3=d=(d1+d2)=$baseline$_{23}$, and two angles: $\phi_2=$angle($TR_2R_3$) and $(180-\phi_3)=$angle($TR_3R_2$). baseline$_{23}$ can be determined upon determining the coordinates at $R_2$ and $R_3$, and the angles $\phi_2$ and $\phi_3$ can be estimated from equation (5):

$$\phi_2 \approx arccos\ [C*(TDOA_{12}-TDOT_{12})/baseline_{12}];$$

$$\phi_3 \approx arccos\ [C*(TDOA_{23}-TDOT_{23})/baseline_{23}];$$

then, looking at triangle $TR_2R_3$, and assuming that $R_1$-$R_2$-$R_3$ are on the X-axis, it is clear that:

$(y-y_2)=d2*\tan(\phi_2)$; and $(y-y_3)=d1*\tan(180-\phi_3)$; and since $(d1+d2)=d=$baseline$_{23}$, then:

$$baseline_{23}=(y-y_2)/\tan(\phi_2)+(y-y_3)/\tan(180-\phi_3).$$

From this equation the coordinate y of the beacon can be resolved.

According to the coordinate system depicted in FIG. 4, $y_1=y_2=y_3=0$, then equation (19) turns to be: baseline$_{23}$=y/tan($\phi_2$)+y/tan(180-$\phi_3$)=y/tan($\phi_2$)-y/tan($\phi_3$), so: y=baseline$_{23}$/(1/tan($\phi_2$)-1/tan($\phi_3$)].

And the coordinate x of the beacon can be also resolved according to:

$$\tan(\phi_2)=y/(x_2-x). \qquad (20)$$

According to the coordinate system depicted in FIG. 4, $x_2=0$, then equation (20) turns to be: x=-y/tan($\phi_2$)=baseline$_{23}$/[tan($\phi_2$)/tan($\phi_3$)-1]1.

Equations (19) and (20) are not applicable when moving directly to the beacon, i.e. when $\phi_2$ or $\phi_3$ are zero, however can be employed when equation (5) indicates that $\phi_2$ is not zero, in order to estimate the distance to the beacon.

According to a second embodiment of the present invention, the transmission time instants and the receiving time instants are determined with respect to a substantially same time reference. Specifically, both the beacon and detecting device are embedded with a GPS receiver, and synchronize their internal clock to the GPS time, in frequency and in phase. As already discussed, FIG. 8 presents the structure by which the detecting device generates an internal clock phased locked to the GPS 1 PPS signal. This internal clock, at the detecting device, is preferably configured at a frequency of 20 MHz, providing approximately 0.1 μs in resolution (due to the clock frequency and other factors) for determining the receiving time at the tracking device. In addition, both the beacon and the detecting device read the GPS TOD, so read the present calendar year, month, day, hour, minute and second, with respect to the GPS time.

For determining the location of the beacon, typically in the acquisition mode, according to this second embodiment of the invention, measurements at two locations (i.e. single baseline) are sufficient, since each of these measurements provides a LOP, so the beacon position can be fixed following the steps of:

a. at said beacon, determining the transmission time of said first signal and second signal with respect to a predefined phase of said same time reference;

b. at said device, determining the location of said radio beacon, from: said coordinates at said first and second locations, and the receiving time instant of said first and second signal, and said predefined phase of said same time reference.

FIG. 11 shows Transmission and Detection Synchronized with GPS Clock according to the second embodiment of the present invention. The upper diagram showing the transmitted signal vs. the transmitter time (clock) and the lower diagram showing the transmitted signal as detected at the moving receiving device, according to the receiving clock. On both diagrams, 1 PPS (1 Hz) and 1000 PPS (1 KHz) pulses synchronized with the GPS clock are depicted, obviously aligned in time, hence synchronizing the receiving clock with the transmission clock. The Transmitted signal at the upper diagram is exactly aligned with a 1000 PPS pulse, and at the lower diagram, the time between the receiving time of the signal and the nearest past 1000 PPS pulse is indicated as range/c, wherein c means the speed of light.

According to this second embodiment of the invention, the transmission time of all periodic signals transmitted by the beacon are synchronized with the GPS clock, referring to the phase of the rising edge of a 1 KHz clock phased locked to the GPS 1 PPS (1 Hz) clock. The resolution for configuring time intervals between consecutive signal transmissions at the beacon is set to $\Delta T=1$ ms, and permitted TDOTs are: 50 s$\pm$1 ms*n, where n=0, 1, 2, ..., 2500.

Then, according to the second embodiment of the invention, as the receiving time is also determined according to the GPS clock, the TOA is determined as the receiving time instant minus the time reading of the nearest past 1 KHz rising edge. If the distance to the beacon is 300 Km or less, then the TOA can be uniquely determined, this way, since the difference between successive 1 KHz pulses is 1 ms, equivalent in range to 300 Km.

Using any of the 1000 PPS pulses as a phase reference for transmission is actually specifying the maximum time between a predefined phase of the time reference known to the device and time of transmission to 1 ms, since the time difference between successive 1000 PPS pulses is 1 ms. Assuming maximum range to beacon of 300 Km, then the maximum propagation time of that signal is 300 Km/c=1 ms, so there is no ambiguity at the detecting device in associating the detected signal with a specific (nearest past) 1000 PPS pulse, at which the signal was transmitted. Thus, every signal transmitted by the beacon and detected at the receiving device provides a TOA, i.e. exact range to the beacon, i.e. a circular (2D) LOP. As skilled persons appreciate, TOA based navigation requires less measurements than TDOA based navigation in order to fix a location or determine a direction, since each measurement provides more information due to the time synchronization. Obviously, this requires a time synchronizing scheme, and in the context of the second embodiment of the invention that scheme is associated with a GPS receiver at the beacon and at the detecting device. Once the beacon transmission is synchronized with the GPS time, for all beacons, then transmissions of all active beacons are synchronized among themselves, what may have further benefits, such as reducing the transmission collision rate among beacons. The latter is disclosed in U.S. Pat. No. 7,440,427 by D. Katz (the present applicant), for: Increasing Channel Capacity of TDMA Transmitters in Satellite based Networks.

Other aspects of using an external source for clock synchronization in communication systems are disclosed in U.S. Pat. No. 7,522,639 by D. Katz (the present applicant), for: Synchronization among Distributed Wireless Devices Beyond Communications Range.

As persons skilled in the art appreciate, TOA or TDOA methods can be similarly applied when an infrastructure of receivers is configured to locate a transmitter, or when a receiver navigates based on signals transmitted by an infrastructure of transmitters. Equally, this symmetry is valid to a moving receiver configured to locate a transmitter, or receiver configured to locate a moving transmitter, since the movement of a transmitter with respect to a receiver is equivalent to the opposite movement of the receiver with respect to the transmitter, in the scope of the present invention.

Then, according to a third embodiment of the invention, the beacon is moving, and a static detecting device determines the direction to and the location of the beacon. In this case the beacon is installed onboard a plane or space vehicle, transmitting periodic signals at a fixed time period (TDOT), known in advance at the detecting station. The detecting device is based on the block diagram presented in FIG. 8, and the direction finding scenario based on FIG. 6.

Interpreted according to the third embodiment of the invention, FIG. 6 illustrates a helicopter assumed to have a beacon onboard, and flying on a line passing at points $R_1$ and $R_2$, wherein at point $R_2$ the angle $\phi_2$ between its course and a detecting device at point T(x, y) is to be determined. The beacon onboard the helicopter, assumedly transmitting signal 1 and signal 2 at a transmission time difference of $TDOT_{12}$, respectively from points $R_1$ and $R_2$, and detected at station T at a time difference of $TDOA_{12}$. The equation estimating the angle $\phi_2$ from station T to the helicopter, relatively to the helicopter course, is presented (valid when $TR_1, TR_2 >> R_1R_2$) in this figure and already developed and marked earlier as equation (5): $\cos(\phi_2) \approx c^*(TDOA_{12}-TDOT_{12})/R_1R_2$.

Knowing $TDOT_{12}$ at station T, measuring $TDOA_{12}$, and calculating $R_1R_2$ based on $TDOT_{12}$ and the helicopter speed, $\phi_2$ can be determined at station T.

The angle $\phi_2$ can be also determined from the Doppler Effect. As persons skilled in the art appreciate, when a signal is transmitted by the beacon and detected at station T, the Doppler shift is proportional to the speed vector between the transmitter and the receiver, hence: $\cos(\phi_2)=\Delta f/f^*c/v$, wherein $\Delta f/f$ is the frequency shift detected at the receiver divided by the transmission frequency, v is the helicopter velocity and c is the speed of light, so alternatively, if $\Delta f/f$ is determined at station T, as well as $TDOT_{12}$ and $TDOA_{12}$, then $\cos(\phi_2)$ and the helicopter velocity (v) can be found by solving the two equations: (5) and the Doppler equation, accounting for $R_1R_2=TDOT_{12}*v$.

The present invention further discloses a computer non-transitory readable storage medium storing a program for a mobile device to determine the direction to a radio beacon transmitting periodic signals, the computer program comprising a set of instructions for causing the device to perform the steps of:

a. providing information enabling determining at least the time difference ($TDOT_{12}$) between a transmission time instant of a first signal and a transmission time instant of a second signal, said first and second signals been part of said periodic signals;

b. at a first location, determining the location coordinates, and determining a receiving time instant of said first signal;

c. at a second location, determining the location coordinates, and determining a receiving time instant of said second signal;

d. determining the time difference ($TDOA_{12}$) between the receiving time instant of said first signal and the receiving time instant of said second signal, and the distance ($baseline_{12}$) between said first and second locations;

e. determining a direction to said radio beacon, from said $TDOT_{12}$, $TDOA_{12}$ and $baseline_{12}$.

FIG. 9 illustrates a Flow Chart of Beacon Tracking Process, for a computer program for a mobile device to determine the direction to a radio beacon transmitting periodic signals, referring to the scenario illustrated in FIG. 6; the computer program comprising a set of instructions for causing the device to perform the steps of:

Define $\min(\Delta\phi)$;

Acquire initial coordinates of radio beacon; determine initial distance and initial direction to beacon.

Move in the initial direction to the Radio Beacon, and indicate $\phi_0$;

Set i=1;

Upon Radio Beacon Transmission i, define point $R_i$ and Measure receiving time & self position.

[Loop]—upon Radio Beacon Transmission i+1, define point $R_{i+1}$ and Measure receiving time & self position.

Determine $TDOA_{i(i+1)}$ and $TDOT_{i(i+1)}$ and $R_iR_{(i+1)}$.

Determine $\cos \phi_{(i+1)} = C*(TDOA_{i(i+1)} - TDOT_{i(i+1)}] / R_iR_{(i+1)}$; Indicate $\phi_{(i+1)}$;

Check if $|\phi_{(i+1)}| < \min(\Delta\phi)$.

If the answer is Yes, then indicate: Keep Current Course;

If the answer is No, then indicate: Change Course by $\phi_{(i+1)}$;

End if initial distance made good; otherwise update: i=i+1 and go to [Loop].

In order to confirm been close enough to the beacon to end this process, equations (19) and (20) can be employed based on the calculated $\phi_1$ and $\phi_{(i+1)}$, provided that these angles are not zero.

The provided information enabling determining $TDOT_{12}$ is preferable associated with at least one of:

a. data configured in advance at said beacon and at said device;

b. data communicated from said beacon to said device;

c. data specifying $TDOT_{12}$;

d. minimum time difference ($\Delta T$) between permitted values of $TDOT_{12}$;

e. time of transmission with respect to the beacon time reference;

f. time of transmission with respect to a time reference known to said device;

g. time between a predefined phase of said time reference known to said device and time of transmission;

h. maximum operating range;

i. maximum length of $baseline_{12}$.

Preferably, the computer program causing the device to further:

estimate the direction from said second location to said beacon, relatively to the direction from said first location to said second location, as an angle of:

$\arccos [c*(TDOA_{12} - TDOT_{12})/baseline_{12}]$; wherein c is the speed of light.

Preferably, while tracking the beacon, the computer program causing the device to:

determine the direction from said first location to a second location such that $[baseline_{12} - c*(TDOA_{12} - TDOT_{12})]$ is substantially small.

The present invention additionally discloses a radio beacon enabling tracking by a moving device, said beacon configured to transmit periodic signals enabling said device to accurately determine a reception time instant of said signals, wherein the time difference between transmissions of at least two of said signals is configured substantially equal to m times $\Delta T$, wherein m is an integer number, and $\Delta T$ is greater than at least one of:

a. the maximum specified range between said beacon and said device, divided by the speed of light;

b. the maximum distance between locations where said two signals are detected, divided by the speed of light.

FIG. 12 illustrates the Radio Beacon Block Diagram, according to said first embodiment of the invention. The beacon comprises a DSSS transmitter configured to transmit short periodic signals enabling a tracking device to accurately determine the reception time instant of said signals, by autocorrelation to the transmitted PRN sequence. By controlling the phase of the PRN Code Generator, as illustrated by the SYNC block coupled to the PRN Generator, the time difference (TDOT) between successive signals is configured, for example in the range of 47.5 s<TDOT<52.5 s. Though that SYNC function is depicted to control only the PRN Generator, it is also possible to apply it to other beacon clocks, for example by alternatively synchronizing the master clock, adding another PLL between the TCXO and the clock generators fed by it, and locking this additional PLL to the SYNC output. As appreciated by skilled persons, the DSSS transmitter depicted in this figure is well known in the present art, for example used by GNSS transmitters or pseudolites; the parameters selected for this embodiment should be considered as example, while other parameters could be configured, such as the transmission frequency, PRN chip rate and the message bit rate, as well as the master clock frequency. A skilled person also understands that such a beacon typically comprises additional building blocks, such as a micro controller or processor, power (DC and RF) circuitry, a battery and so on, that are not depicted since are well known in the art.

According to this first embodiment of the invention, the time difference (TDOT) between successive signals is configured such that $TDOT = m*\Delta T$, m being an integer number and $\Delta T = 1$ ms, wherein $\Delta T$ is greater than the maximum distance between locations where two successive signals are detected, divided by the speed of light.

Hence, if the detecting device is moving at a speed [v], then: $\Delta T > v*m*\Delta T/c$, i.e. $c/v > m$; and considering m=2500, then [v] is restricted to: $v < c/m \approx 120$ Km/s$\approx$432,000 Km/h, which is applicable even to MEO satellites.

The requirement that $\Delta T > $[maximum distance between locations where two successive signals are detected/c], requires: 1 ms$>baseline_{12}/c \approx v*50$ s/c, limiting: $v < c*1$ ms/50 s=c/50,000=6 Km/s, still applicable to MEO satellites, as well as airborne, marine and vehicular mounted detecting devices.

According to the first embodiment of the present invention, this beacon is one of:

a Personal Locator Beacon (PLB), to be carried by an individual; or an Emergency Position Indicating Radio Beacon (EPIRB), to be installed on a vessel; or an Emergency Locator Beacon (ELT) to be installed onboard an airplane.

Preferably, the radio beacon further comprises a GNSS receiver, and configured to determine the transmission time of said two signals with respect to a predefined phase of a clock synchronized with said GNSS clock.

According to said second embodiment of the invention, the radio beacon further comprises a GNSS receiver, and configured to determine the transmission time of said two signals with respect to the rising edge of a 1 KHz clock synchronized with said GNSS, as illustrated in FIG. 13 (block diagram) and FIG. 11 (timing diagram). FIG. 13 illustrates the Beacon Block Diagram According to a second embodiment of the present invention. This figure comprises all the building blocks depicted in FIG. 12 (the first embodiment), and in addition: a GPS receiver+antenna is depicted at the upper-left corner, from which a 1 Hz (1 PPS) signal is output, coupled to a PLL block generating a 1 KHz (1000 PPS) clock. That 1 KHz clock is routed to the SYNC block that controls the phase of the PRN sequence, consequently controlling the time of transmission and TDOT.

According to this second embodiment, the time period of the 1 KHz clock, i.e. 1 ms, is not shorter than the maximum specified range between the beacon and the tracking device, divided by the speed of light; so that distance should be smaller than c*1 ms=300 Km. Then, with respect to the 1 KHz clock PLL'ed to the 1 Hz GNSS clock, TOA can be determined at 0-300 Km from the beacon, however a detecting device onboard a MEO satellite will better be employed related to a ~10 Hz PLL'ed clock, to avoid ambiguous TOA results; still, in either case, no limitations on TDOA measurements.

According to the second embodiment of the present invention, the GNSS receiver comprised in the beacon is at least one of: GPS receiver, or Galileo receiver, or Glonass receiver.

As skilled persons appreciate, a "radio beacon" is typically an RF transmitter that broadcasts data not necessarily attended by a human user. However, in the context of the present invention, a radio beacon is any kind of RF transmitter that communicates data, even initiated by a human user, such as a mobile phone or mobile satellite terminal.

According to a forth embodiment of the invention, the beacon is a CDMA mobile phone, synchronized to the GPS time, and configured to transmit upon a user command, but align its applied spreading code with a 1 KHz timing signal, as shown in FIG. 11. Hence, the transmission timing in FIG. 11 refers to a specific predefined phase (e.g. rising edge of a specific chip of the modulating code) of said spreading code. At the detecting device, the receiving time is also determined according to the GPS clock, so the TOA is determined as the receiving time instant referring to said predefined phase, minus the time reading of the nearest past 1 KHz rising edge. If the distance to that mobile phone is 300 Km or less, then the TOA can be uniquely determined at the detecting device.

Furthermore, the presently disclosed method for tracking a radio beacon from a moving device can be also applied to a satellite tracking a beacon, either independently or involving a base station.

According to a fifth embodiment of the invention, a radio beacon transmits periodic signals, compatible to a receiver onboard a satellite. The satellite is orbiting around the center of the earth, and from time to time the beacon signals are detected onboard the satellite, and possibly relayed to a base station, and $TDOA_{12}$ and $baseline_{12}$ are determined according to the present invention, either onboard the satellite or at said base station. Knowing $TDOA_{12}$ and $baseline_{12}$ and $TDOT_{12}$, in addition to a further measurement providing $TDOA_{34}$ and $baseline_{34}$ and $TDOT_{34}$, enable determining the beacon 2D location by a single satellite. As already indicated, further measurements enable determining the 3D position of the beacon.

According to this fifth embodiment, the detecting device is installed onboard a GPS or Galileo satellite, or alternatively a "bent pipe" relay is installed onboard the satellite enabling a ground station to track the beacon. Such satellite is typically orbiting at about 26,000 Km from the earth center, at 12 h period, so its linear speed is approximately $2*\pi*26{,}000$ Km/12 h≈13,600 Km/h≈4 Km/s. Considering a radio beacon that transmits every ~50 s, our satellite will detect two such consecutive signals at less than 4 Km/s*50 s=200 Km apart (straight line), i.e. may define $baseline_{12}$≈200 Km according to the present invention, i.e. $baseline_{12}/c$≈0.7 ms<1 ms. Accordingly, if the beacon TDOT is configured at a resolution of 1 ms, then it is possible to determine $TDOT_{12}$ at the ground station (assuming that the receiving time is measured at the satellite and reported to the ground station, which in turn determines $TDOA_{12}$) as the number in form of 1 ms*n (n=integer) nearest to $TDOA_{12}$, and along with the measured $baseline_{12}$, the direction to the beacon or one hyperbolic LOP on which the beacon is placed can be determined. Based on these and similar additional measurements, the location of the beacon can be determined, by equations (17) and (18), or equations (19) and (20), or a combination thereof.

According to a sixth embodiment of the present invention, the radio beacon is a Marine Survivor Locating Device (MSLD), comprising an RF transmitter configured to broadcast periodic signals, when active, at a constant TDOT, known in advance at a compatible detecting device; said device comprising a GPS receiver and configured to be installed onboard a vessel.

According to this sixth embodiment of the invention, upon detecting, at two different locations, two consecutive signals transmitted by such active MSLD, the detecting device can determine $TDOA_{12}$ and $baseline_{12}$, and knowing also $TDOA_{12}$, can use equation (5) to determine the direction to the MSLD. Preferably, TDOT is configured short enough to provide small estimation error using equation (5). From case (10) an error in direction of less than 6° is expected when the beacon is 5*$baseline_{12}$ away from the detecting device, a distance that can be made when sailing for a time of 5*TDOT.

Further measurements, at another pair of locations, enable the detecting device determining the location of this MSLD, based on equations (17) and (18), or equations (19) and (20), or a combination thereof.

The true scope the present invention is not limited to the presently preferred embodiments disclosed herein. For example, the foregoing disclosure uses explanatory terms, such as GPS, DSSS and CDMA, and particularly radio beacon and the Cospas-Sarsat system, which should not be construed so as to limit the scope of protection of the claims, or to otherwise imply that the inventive aspects of the disclosed methods and devices are limited to the particular methods and apparatus disclosed.

In many cases, the place of implementation described herein is merely a designer's preference and not a hard requirement. For example, functions disclosed as implemented at the detecting device may alternatively be partially implemented at cellular base stations or satellite ground stations, as well as on cellular devices or artificially orbiting satellites. Given the rapidly declining cost of digital signal processing and other processing functions, it is easily possible, for example, to transfer the processing or a particular function from one of the functional elements described herein to another functional element without changing the inventive operation of the system.

The invention claimed is:

1. A method for tracking a radio beacon from a moving device, comprising the steps of:
   a. at said radio beacon transmitting periodic signals;
   b. providing said device with information enabling determining at least a time difference $TDOT_{12}$ between a transmission time instant of a first signal and a transmission time instant of a second signal, said first and second signals been part of said periodic signals;
   c. at said device, at a first location, determining location coordinates, and a receiving time instant of said first signal;
   d. at said device, at a second location, determining location coordinates, and a receiving time instant of said second signal;
   e. at said device, determining a time difference $TDOA_{12}$ between the receiving time instant of said first signal and the receiving time instant of said second signal, and a distance $baseline_{12}$ between said first and second locations;
   f. at said device, determining a direction to said radio beacon, from said $TDOT_{12}$, $TDOA_{12}$ and $baseline_{12}$.

2. The method according to claim 1, wherein said information is associated with at least one of:
   a. data configured in advance at said beacon and at said device;
   b. data communicated from said beacon to said device;
   c. data specifying $TDOT_{12}$;
   d. minimum time difference ($\Delta T$) between permitted values of $TDOT_{12}$;
   e. time of transmission with respect to a beacon time reference;
   f. time of transmission with respect to a time reference known to said device;
   g. time between a predefined phase of said time reference known to said device and time of transmission;
   h. maximum operating range;
   i. maximum length of $baseline_{12}$.

3. The method according to claim 1, at said device, estimating the direction from said second location to said beacon, relatively to the direction from said first location to said second location, as an angle of: $\arccos[c*(TDOA_{12}-TDOT_{12})/baseline_{12}]$; wherein c is the speed of light.

4. The method according to claim 1, at said device, for moving towards the beacon, at said first location, determining the direction to a second location such that $[baseline_{12}-c*(TDOA_{12}-TDOT_{12})]$ is zero.

5. The method according to claim 1, at said device, further comprising the steps of:
   a. providing information enabling determining a time difference $TDOT_{34}$ between transmission of a third signal and a forth signal, of said periodic signals;
   b. at a third location, determining location coordinates, and a receiving time instant of said third signal;
   c. at a forth location, determining location coordinates, and a receiving time instant of said forth signal;
   d. determining a time difference $TDOA_{34}$ between said receiving time instant of said third signal and said receiving time instant of said forth signal, and determining a distance $baseline_{34}$ between said third location and said forth location;
   e. determining the location of said radio beacon, from said $TDOT_{12}$, $TDOA_{12}$, $baseline_{12}$, $TDOT_{34}$, $TDOA_{34}$ and $baseline_{34}$.

6. The method according to claim 1, wherein the period of said periodic signals is an integer number multiplied by $\Delta T$, wherein $\Delta T$ is greater than at least one of:
   a. the maximum operating range divided by the speed of light;
   b. the maximum length of $baseline_{12}$ divided by the speed of light.

7. The method according to claim 1, wherein said transmission time instants and receiving time instants are determined with respect to a same time reference.

8. The method according to claim 7, further comprising the steps of:
   a. at said beacon, determining the transmission time of said first signal and second signal with respect to a predefined phase of said same time reference;
   b. at said device, determining the location of said radio beacon from: said coordinates at said first and second locations, and the receiving time instant of said first and second signal, and said predefined phase of said same time reference.

9. A portable device for tracking a radio beacon, said device comprising: a first receiver, a GNSS receiver, a computer and an indicator; said device configured with at least two operating modes: acquisition and tracking; in acquisition mode, said device configured to determine initial geolocation coordinates of said beacon, and in tracking mode said device configured to determine a direction to said beacon while moving substantially in said direction; said device configured to detect signals periodically transmitted by said radio beacon and to accurately measure time of reception of said signals, and provided with information enabling determining at least a time difference $TDOT_{12}$ between transmission of a first signal and transmission of a second signal, of said periodic signals; and determine, at a first location, location coordinates, and a receiving time of said first signal; and determine, at a second location, location coordinates, and a receiving time of said second signal; and determine a time difference $TDOA_{12}$ between said receiving time of said first and said second signal, and determine a distance $baseline_{12}$ between said first location and said second location; and determine a direction to said radio beacon, based on said $TDOT_{12}$, $TDOA_{12}$ and $baseline_{12}$; and indicate said direction to a user.

10. The device according to claim 9, wherein said information is associated with at least one of:
    a. data configured in advance at said beacon and at said device;
    b. data communicated from said beacon to said device;
    c. data specifying $TDOT_{12}$;
    d. minimum time difference ($\Delta T$) between permitted values of $TDOT_{12}$;
    e. time of transmission with respect to the beacon time reference;
    f. time of transmission with respect to a time reference known to said device;
    g. time between a predefined phase of said time reference known to said device and time of transmission;
    h. maximum operating range;
    i. maximum length of $baseline_{12}$.

11. The device according to claim 9, further configured to estimate the direction from said second location to said beacon, relatively to the direction from said first location to said second location, as an angle of: $\arccos[c*(TDOA_{12}-TDOT_{12})/baseline_{12}]$; wherein c is speed of light.

12. The device according to claim 9, further configured, in tracking mode, for a given first location, to determine the direction to a second location such that [$baseline_{12}-c*(TDOA_{12}-TDOT_{12})$] is zero.

13. The device according to claim 9, further in acquisition mode, provided with information enabling determining a time difference $TDOT_{34}$ between transmission of a third signal and a forth signal, of said periodic signals; and configured to determine, at a third location, location coordinates, and receiving time of said third signal; and to determine at a forth location, location coordinates, and receiving time of said forth signal; and determine a time difference $TDOA_{34}$ between said receiving time of said third signal and forth signal, and a distance $baseline_{34}$ between said third location and said forth location; and determine a location of said radio beacon, from said $TDOT_{12}$, $TDOA_{12}$, $baseline_{12}$, $TDOT_{34}$, $TDOA_{34}$ and $baseline_{34}$.

14. The device according to claim 9, wherein the period of said periodic signals is an integer number times $\Delta T$, wherein $\Delta T$ is greater than at least one of:
   a. a maximum operating range divided by the speed of light;
   b. the maximum length of $baseline_{12}$ divided by the speed of light.

15. The device according to claim 9, wherein said transmission time instants and receiving time instants are determined with respect to a same time reference.

16. The device according to claim 15, wherein said transmission time of said first signal and second signal are determined with respect to a predefined phase of said same time reference, and said device configured to determine a location of said radio beacon, from coordinates at said first and second locations, and the receiving time instant of said first and second signal, and said predefined phase of said same time reference.

17. A radio beacon comprising an accurate clock generator, a data processor and a carrier frequency generator, enabling tracking by a moving device, the beacon configured to transmit periodic signals at timing controlled by said clock generator, wherein a time difference between transmissions of at least two of said signals configured substantially equal to m times $\Delta T$, and wherein m is an integer number, and $\Delta T$ is greater than at least one of:
   a. a maximum specified range between said beacon and said device, divided by the speed of light;
   b. a maximum distance between locations where said two signals are detected, divided by the speed of light;
   enabling said device determining a direction to said beacon from said m and $\Delta T$, and from time measured between detecting said two signals, each signal detected at a different location, and from distance measured between said different locations.

18. The radio beacon according to claim 17, said signals modulated according to a direct sequence spread spectrum (DSSS) scheme.

19. The radio beacon according to claim 17, further comprising a GNSS receiver, and configured to determine the transmission time of said two signals with respect to a predefined phase of a clock synchronized with said GNSS clock.

20. The radio beacon according to claim 19, wherein the time period of said clock synchronized with said GNSS clock is not shorter than a maximum specified range between said beacon and said device, divided by the speed of light.

* * * * *